(12) United States Patent
Morris

(10) Patent No.: US 11,482,911 B2
(45) Date of Patent: Oct. 25, 2022

(54) ELECTRICAL POWER DISTRIBUTION SYSTEMS WITH A BYPASS UNIT THAT COUPLES TO A LOAD AND ELECTRICALLY ENGAGES ONE OF TWO ALTERNATE UNITS FOR POWERING THE LOAD AND RELATED METHODS

(71) Applicant: Eaton Intelligent Power Limited, Dublin (IE)

(72) Inventor: Robert A. Morris, Sanford, NC (US)

(73) Assignee: Eaton Intelligent Power Limited, Dublin (IE)

( * ) Notice: Subject to any disclaimer, the term of this patent is extended or adjusted under 35 U.S.C. 154(b) by 8 days.

(21) Appl. No.: 16/911,557

(22) Filed: Jun. 25, 2020

(65) Prior Publication Data
US 2020/0412211 A1  Dec. 31, 2020

Related U.S. Application Data

(60) Provisional application No. 62/867,980, filed on Jun. 28, 2019.

(51) Int. Cl.
| | |
|---|---|
| H02B 1/48 | (2006.01) |
| H02K 11/33 | (2016.01) |
| H02B 1/04 | (2006.01) |
| H02B 1/20 | (2006.01) |

(52) U.S. Cl.
CPC ............... H02K 11/33 (2016.01); H02B 1/04 (2013.01); H02B 1/20 (2013.01); H02B 1/48 (2013.01)

(58) Field of Classification Search
None
See application file for complete search history.

(56) References Cited

U.S. PATENT DOCUMENTS

| | | |
|---|---|---|
| 4,024,441 A | 5/1977 | Coyle et al. |
| 4,503,408 A | 3/1985 | Mrenna et al. |
| 5,910,760 A | 6/1999 | Malingowski et al. |
| 7,525,809 B2 | 4/2009 | Bergmann et al. |
| 8,934,218 B2 | 1/2015 | Morris |
| 9,338,904 B2 | 5/2016 | Stoner et al. |
| 9,460,881 B1 | 10/2016 | Morris |
| 9,692,254 B2 | 6/2017 | Tomassi |
| 9,696,704 B2 | 7/2017 | Xu et al. |
| 9,843,171 B2 | 12/2017 | Richards et al. |
| 9,941,645 B2 | 4/2018 | Morris |
| 10,292,290 B2 * | 5/2019 | Morris ............... H02B 1/20 |
| 10,348,064 B2 * | 7/2019 | Jung ............... H02J 3/18 |
| 10,856,453 B2 * | 12/2020 | Easton ............... H02B 7/06 |

(Continued)

OTHER PUBLICATIONS

Allen-Bradley "PowerFlex 70 Adjustable Frequency AC Drive" User Manual (112 pages) (2001).

(Continued)

*Primary Examiner* — Courtney L Smith
(74) *Attorney, Agent, or Firm* — Stanek Lemon Crouse & Meeks, PA

(57) ABSTRACT

Electrical power distribution devices with a bypass unit that electrically engages one of two alternate units for powering a load while electrically isolating the other using a six pole power transfer switch and mechanical and electrical interlocks to allow a technician to access one of the alternate units when de-energized and in position while the other of the alternate units is energized and powering the load.

20 Claims, 19 Drawing Sheets

(56) References Cited

U.S. PATENT DOCUMENTS

| | | | |
|---|---|---|---|
| 10,923,888 B2* | 2/2021 | Benson | H02B 1/48 |
| 2001/0020834 A1* | 9/2001 | Berkowitz | H02H 7/222 |
| | | | 318/272 |
| 2008/0022673 A1 | 1/2008 | Morris et al. | |
| 2008/0137266 A1 | 6/2008 | Jensen et al. | |
| 2013/0077210 A1 | 3/2013 | Morris | |
| 2014/0126120 A1 | 5/2014 | Lehtola et al. | |
| 2015/0115719 A1* | 4/2015 | Siciliano | H02J 9/06 |
| | | | 307/64 |
| 2015/0214779 A1* | 7/2015 | Tomassi | H02J 9/061 |
| | | | 307/65 |
| 2017/0237287 A1* | 8/2017 | Dolinski | H02B 11/12 |
| | | | 307/115 |
| 2018/0048159 A1* | 2/2018 | Narla | H01L 31/042 |
| 2019/0190240 A1 | 6/2019 | Kroushl et al. | |
| 2019/0199125 A1* | 6/2019 | Oliver | H02J 9/06 |

OTHER PUBLICATIONS

Eaton Corporation "Using an adjustable frequency drive with a soft starter bypass" Product Application AP03902004E (2 pages) (2009).
Eaton Corporation "Freedom FlashGard motor control center" Instruction Booklet IM04302001E (36 pages) (2016).

* cited by examiner

ELECTRICAL INTERLOCKING SYSTEM

| INTERLOCK | PRIMARY UNIT 50₁ | SECONDARY UNIT 50₂ | BYPASS UNIT 10 |
|---|---|---|---|
| SECONDARY UNIT DISCONNECT (BREAKER) | ENERGIZED BREAKER AUXILIARY SWITCH AND/OR RELAY SENDS TRIP SIGNAL TO SECONDARY UNIT BREAKER | BREAKER SHUNT TRIP COIL TRIPS SECONDARY UNIT BREAKER | IN PRIMARY MODE |
| PRIMARY UNIT DISCONNECT (BREAKER) | BREAKER SHUNT TRIP COIL TRIPS PRIMARY UNIT BREAKER | ENERGIZED AUXILIARY SWITCH AND/OR MOTOR STARTER RELAY SENDS TRIP SIGNAL TO PRIMARY UNIT BREAKER | IN BYPASS MODE |
| MANUAL BYPASS PRIMARY MODE | ENERGIZED | BREAKER SHUNT TRIP COIL TRIPS BREAKER SECONDARY UNIT BREAKER | IN PRIMARY MODE AUXILIARY SWITCH SENDS TRIP SIGNAL TO SECONDARY UNIT BREAKER |
| MANUAL BYPASS BYPASS MODE | BREAKER SHUNT TRIP COIL TRIPS BREAKER PRIMARY UNIT BREAKER | ENERGIZED | IN BYPASS MODE AUXILIARY SWITCH SENDS TRIP SIGNAL TO PRIMARY UNIT BREAKER |
| SECONDARY UNIT DISCONNECT (POWER DISCONNECT ASSEMBLY) | ENERGIZED POWER DISCONNECT ASSEMBLY AUXILIARY SWITCH SENDS TRIP SIGNAL TO SECONDARY UNIT BREAKER | BREAKER SHUNT TRIP COIL TRIPS SECONDARY UNIT BREAKER | IN PRIMARY MODE |
| PRIMARY UNIT DISCONNECT (POWER DISCONNECT ASSEMBLY) | BREAKER SHUNT TRIP COIL TRIPS BREAKER OF PRIMARY UNIT BREAKER | ENERGIZED POWER DISCONNECT ASSEMBLY AUXILIARY SWITCH SENDS TRIP SIGNAL TO PRIMARY UNIT BREAKER | IN BYPASS MODE |

FIG. 11

| MECHANICAL INTERLOCKING SYSTEM | | | |
|---|---|---|---|
| | PRIMARY UNIT 50₁ | SECONDARY UNIT 50₂ | BYPASS UNIT 10 |
| PRIMARY UNIT DISCONNECT (POWER DISCONNECT ASSEMBLY) | DE-ENERGIZED POWER DISCONNECT ASSEMBLY PADLOCK OFF | ENERGIZED | IN BYPASS MODE |
| SECONDARY UNIT DISCONNECT (POWER DISCONNECT ASSEMBLY) | ENERGIZED | DE-ENERGIZED POWER DISCONNECT ASSEMBLY PADLOCK OFF | IN PRIMARY MODE |
| PRIMARY UNIT DISCONNECT (BYPASS) | ENERGIZED | DE-ENERGIZED | BYPASS UNIT OPERATING MECHANISM PADLOCKED IN PRIMARY MODE |
| SECONDARY UNIT DISCONNECT (BYPASS) | DE-ENERGIZED | ENERGIZED | BYPASS UNIT OPERATING MECHANISM PADLOCKED IN BYPASS MODE |
| SECONDARY UNIT KEY INTERLOCKING (BREAKER) | DE-ENERGIZED | SINGLE KEY ENABLES SECONDARY UNIT BREAKER TO BE OPERATED | |
| PRIMARY UNIT KEY INTERLOCKING (BREAKER) | SINGLE KEY ENABLES PRIMARY BREAKER TO BE OPERATED | DE-ENERGIZED | |

*FIG. 12*

ELECTRICAL POWER DISTRIBUTION SYSTEMS WITH A BYPASS UNIT THAT COUPLES TO A LOAD AND ELECTRICALLY ENGAGES ONE OF TWO ALTERNATE UNITS FOR POWERING THE LOAD AND RELATED METHODS

RELATED APPLICATIONS

This application claims the benefit of and priority to U.S. Provisional Application Ser. No. 62/867,980, filed Jun. 28, 2019, the content of which is hereby incorporated by reference as if recited in full herein.

FIELD OF THE INVENTION

The present invention relates to electrical power distribution systems and is particularly suitable for motor control centers.

BACKGROUND OF THE INVENTION

In general, electrical power distribution systems distribute electrical power from power sources, such as private or public power grids, to different loads, such as motors. As a specific example, motor control centers (MCC) distribute electrical power to and control motors in a central location. MCCs can include structures, cabinets or enclosures containing a common power bus and multiple, typically modular, bucket assemblies or units, which generally contain a motor starter of various types, a circuit breaker or fuse(s) and a power disconnect. See, e.g., U.S. Pat. No. 4,024,441, the contents of which are hereby incorporated by reference as if recited in full herein. Eaton Corporation has recently introduced a MCC product line with compact bucket assemblies that conveniently plug into a slot, compartment or space in an MCC structure. The product is sold under the product name, Freedom 2100 MCC. See also, U.S. Pat. No. 8,934,218, the contents of which are hereby incorporated by reference as if recited in full herein.

SUMMARY OF EMBODIMENTS OF THE INVENTION

Embodiments of the invention are directed to enclosed bypass units that can connect to separate primary and secondary units with motor starters, allowing for one to power a load at any one time through the bypass unit while electrically isolating the other thereby providing redundant powering options which can electrically isolate the primary and secondary units from a load and/or line side bus and each other.

Embodiments of the invention are directed to electrical power distribution systems that include: a power bus; a bypass unit with a power transfer switch coupled to a load; a first unit with a first disconnect switch configured to selectively couple the power bus to the power transfer switch; and a second unit with a second disconnect switch configured to selectively couple the power bus to the power transfer switch. The power transfer switch of the bypass unit is configured to selectively couple the first unit to the load or the second unit to the load. When the power transfer switch couples the first unit to the load, the first disconnect switch is closed while the second disconnect switch is open to electrically isolate the second unit from the load and the first unit. When the power transfer switch couples the second unit to the load, the second disconnect switch is closed while the first disconnect switch is open to electrically isolate the first unit from the load and the second unit.

The first and second units can each further include a housing and a power disconnect assembly with extendable/retractable power stabs that independently move relative to the housing to connect to and disconnect from the power bus. The extendable/retractable power stabs of only one of the first unit or the second unit can be permitted to be connected to the power bus at any one time.

The bypass unit can include a housing with a front wall, side walls and a closed rear wall and can be devoid of power stabs. The bypass unit can be configured so that it does not directly connect to the power bus.

Each of the bypass unit, the first unit and the second unit can include a separate housing that is independently insertable and removable from a respective compartment in at least one structure of the electrical power distribution system.

The electrical power distribution system can also include at least one structure with defined spaced-apart internal compartments that hold the bypass unit, the first unit and the second unit in different ones of the defined spaced-apart internal compartments. The first unit can have a first front door with a first disconnect operator handle operably coupled to the first disconnect switch. The second unit can have a second front door with a second disconnect operator handle operably coupled to the second disconnect switch. The electrical power distribution system can further include interlocks that (a) prevent the first door from opening when either the first disconnect switch is closed or the first unit is coupled to the load and (b) prevent the second door from opening when either the second disconnect switch is closed or the second unit is coupled to the load.

The bypass unit and the first and second units can be configured to be insertable into and removable from spaced-apart compartments of a structure.

The first and second disconnect switches can be circuit breakers, and the first and second units can be operatively connected and configured to cause a first one of either the first disconnect switch or the second disconnect switch to trip to an open state when a second one of the first disconnect switch or the second disconnect switch is closed to allow conduction whereby only a single one of the first or second disconnect switch is in an on state at any one time.

The electrical power distribution system can be a motor control center (MCC).

The first disconnect switch and the second disconnect switch can each include or be a circuit breaker.

The first unit can have a first motor starter and the second unit can have a second motor starter.

The first unit and the second unit can have a motor starter and be configured as one of options A-L:

| Option | first unit | second unit |
| --- | --- | --- |
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |

-continued

| Option | first unit | second unit |
|---|---|---|
| J | VFD unit | IEC Starter unit |
| K | Feeder Breaker | Feeder Breaker |
| L | Feeder Fused Disconnect Switch | Feeder Fused Disconnect Switch |

The power transfer switch can include a six-pole isolating switch. The six-pole isolating switch can have a first set of three switch contacts coupled to the first unit and a second set of three switch contacts coupled to the second unit to thereby allow the six-pole isolating switch to selectively couple the first unit or the second unit to the load.

The bypass unit can further include a first conductor coupled to the first set of switch contacts, a second conductor coupled to the second set of switch contacts, and a third conductor configured to couple to the load, the first conductor extending from the bypass unit a distance sufficient to couple to the first unit, the second conductor extending from the bypass unit a distance sufficient to couple to the second unit, and the third conductor having a length sufficient to couple to the load.

The first and second conductors can extend from the bypass unit through a wire way to connect to the respective first and second units.

The electrical power distribution system can be a motor control center (MCC). The first and second units can each further include a power disconnect assembly with extendable/retractable power stabs that move relative to a rear of the first and second units, respectively, to connect and disconnect from the power bus. Only a single one of the first and second units extend respective power stabs to connect to the power bus at any one time. The first unit and the second unit each comprise a lock that, when deployed, physically (a) locks the power disconnect assembly in at least one defined position associated with one or both (i) a retracted position associated with an electrically isolated state of the respective unit or (ii) an extended position associated with engagement with the power bus and an electrically active state, and/or (b) locks a laterally movable slide from allowing access to an aperture that allows a crank to change a position of the power stabs.

The electrical power distribution system can further include at least one interlock that is configured to allow a user to open or slidably remove one of the first unit or the second unit from the MCC only when a respective unit is in the electrically isolated state while allowing another one of the first or the second unit to be energized and power the load through the bypass unit.

Each of the first and second units can be slidably and releasably held in defined separate compartments of a structure of the electrical power distribution system and each is serially interchangeable with a different corresponding unit having a common size and shape housing thereby allowing modular repair and replacement. The bypass unit can be held in a housing with a closed front door and can have a height that is in a range of about 6-12 inches.

The bypass unit, the first unit and the second unit can be held in separate housings. The bypass unit, the first unit and the second unit can be configured to power a load with horsepower in a range of about ¼ horsepower to 200 horsepower. The bypass unit can have a closed front door with a front operating switch handle coupled to the isolation switch.

The power transfer switch of the bypass unit can include a six-pole isolation switch defining a main switch body and at least one auxiliary switch attached thereto. The at least one auxiliary switch can be configured to transmit and/or receive control signals to/from at least one of the first or second units.

The first disconnect switch can include a first circuit breaker and the second disconnect switch can include a second circuit breaker. The first and second circuit breakers can be electrically interlocked, such that only one of the first and second circuit breakers can be closed at any one time.

The units can be operatively connected and configured to cause a first one of either the first circuit breaker or the second circuit breaker to trip to an open state when a second one of the first circuit breaker or the second circuit breaker is closed to allow only a single one of the first or second circuit breaker to be in an on state at any one time.

The first disconnect switch can include a first circuit breaker and the second disconnect switch includes a second circuit breaker. The first and second circuit breakers and the power transfer switch can be electrically interlocked, such that, when the power transfer switch couples one of the first and second units to the load, only the associated first or second circuit breaker can be closed.

The power transfer switch can include at least one auxiliary switch coupled to the circuit breakers that is configured to transmit a trip signal to the circuit breaker of the first disconnect switch when the power transfer switch couples the second unit to the load.

Other embodiments are directed to a bypass unit for an electrical power distribution system, such as a motor control center, including a structure defining a plurality of compartments having first and second units installed therein. The bypass unit includes a housing configured to insertable into and removable from a compartment and a bypass circuit including a power transfer switch in the housing. The power transfer switch includes a six-pole isolation switch configured to selectively couple the first unit to a load and the second unit to the load. The six-pole isolation switch includes a first set of three switch contacts of the six-pole switch configured to couple to the first unit and a second set of three switch contacts configured to couple to the second unit.

The bypass unit can further include a first conductor electrically coupled to the first set of switch contacts and that extends out of the housing and is configured to electrically couple to the first unit and a second conductor that is electrically coupled to the second set of switch contacts and that extends out of the housing and is configured to electrically couple to the second unit. The first unit and/or the second unit can include a motor starter.

The housing can have a height in a range of about 6-12 inches. Optionally, the bypass unit further includes an operator handle coupled to the six-pole isolation switch and having a first ON position associated with the first set of three switch contacts and a second ON position associated with the second set of three switch contacts The power transfer switch can be configured to power a load from a power bus to the load using a single one of the first unit or the second unit at any one time during normal operation and only when a disconnect switch of another one of the first unit or the second unit is in an off state associated with non-conduction.

The housing can be rectangular and configured to be slidably and releasably held in the compartment.

The bypass unit can further include at least one auxiliary switch attached to the six-pole isolation switch, wherein the at least one auxiliary switch is configured to transmit and/or receive control signals to/from at least one of the first or second units.

Embodiments of the invention are directed to electrical power distribution systems that include: a bypass unit with a power transfer switch configured to electrically couple to a load; a first unit that includes a first disconnect switch electrically coupled to the power transfer switch; and a second unit that includes a second disconnect switch electrically coupled to the power transfer switch. At any one point in time during normal operation, the power transfer switch of the bypass unit is configured to electrically connect a power bus to the load using only one of the first unit or the second unit. When the power transfer switch electrically connects the first unit to the load, the first disconnect switch is electrically on and allows conduction in an electrically active (energized) state while the second disconnect switch is electrically off and in an electrically inactive (non-energized) state with the second unit electrically isolated from the load and the first unit. When the power transfer switch electrically connects the second unit to the load, the second disconnect switch is electrically on and allows conduction in an electrically active (energized) state while the first disconnect switch is electrically off and in an electrically inactive (non-energized) state with the first unit electrically isolated from the load and the second unit.

The first and second units can each further include a power disconnect assembly with extendable/retractable power stabs that move relative to a rear of the first and second units, respectively, to connect and disconnect from the power bus, and only a single one of the first and second units have power stabs in an extended state to connect to the power bus at any one time.

The bypass unit can include an enclosure with a front wall, side walls and a closed rear wall and can be devoid of power stabs and does not directly connect to the power bus.

Each of the bypass unit, the first unit and the second unit can be held in separate housings and can be independently slidably removable from a respective compartment in at least one structure of the electrical power distribution system.

Other embodiments are directed to methods of assembling an electrical power distribution system. The methods include; providing a bypass unit in a housing comprising a power transfer switch configured to serially electrically couple to only two units defined by first and second separate units held in separate respective housings to a load, each of the two units to thereby provide a redundant, back-up drive capacity; and selecting only two units as the first and second units to connect to the bypass unit from one of options A-L:

| Option | first unit | second unit |
|---|---|---|
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder Fused Disconnect Switch | Feeder Fused Disconnect Switch |

The first and second units can each comprise a power disconnect assembly having extendable/retractable power stabs.

The methods can further include: slidably inserting the bypass unit and the selected first and second units into compartments of a structure of the electrical power distribution system; and electrically connecting the power transfer switch of the bypass unit to the selected first and second units during, before or after the inserting.

The electrical power distribution system can be a motor control center.

The selected first and second units and the bypass unit can each have a dedicated, respective front door. The bypass unit can have a closed rear panel. A side wall of the bypass unit can have a plurality of conductors extending outward therefrom including a conductor that couples to a load, and first and second conductors that couple to the selected first and second units.

The power transfer switch of the bypass unit can include a six-pole isolation switch and at least one auxiliary switch attached thereto. The at least one auxiliary switch can be configured to transmit and/or receive control signals to/from at least one of the first or second units.

The power transfer switch can include a six-pole isolating switch configured to electrically couple to a load, and with a first set of three switch contacts coupled only to the first unit while a second set of three switch contacts that are different from the first set of three switch contacts and are coupled only to the second unit to thereby serially couple the load to the first unit and the second unit via the bypass unit.

The bypass unit can further include at least one auxiliary switch attached to the six-pole isolation switch. The at least one auxiliary switch can be configured to transmit and/or receive control signals to/from at least one of the first or second units.

Further features, advantages and details of the present invention will be appreciated by those of ordinary skill in the art from a reading of the figures and the detailed description that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 11 is a table of actions/conditions an electrical interlocking system for electrical power distribution systems according to embodiments of the present invention.

FIG. 12 is a table of actions/conditions for a mechanical interlocking system according to embodiments of the present invention.

DETAILED DESCRIPTION OF EMBODIMENTS OF THE INVENTION

Figure 1:
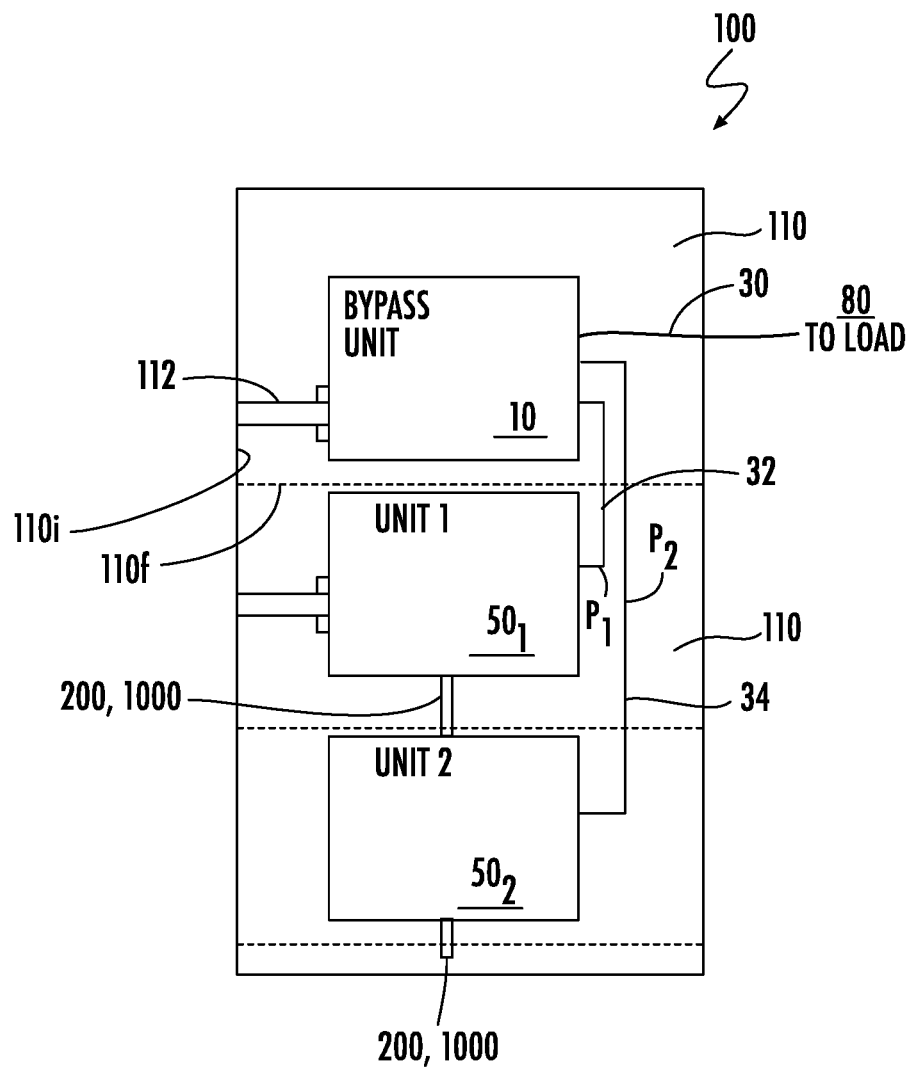
FIG. 1 is a box diagram of an example electrical power distribution system according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device or system in use or operation in addition to the orientation depicted in the figures. For example, if the device or system in the figures is turned over, elements described as "below" or "beneath" other elements or features would then be oriented "above" the other elements or features. Thus, the exemplary term "below" can encompass both an orientation of above and below. The device or system may be otherwise oriented (rotated 90° or at other orientations) and the spatially relative descriptors used herein interpreted accordingly.

The term "about", when used with a number, refers to numbers in a range of +/−20% of the noted value(s).

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The terms "operating mechanism" and "operator mechanism" are used interchangeably and refer to an assembly that is a primary disconnect for a unit and typically has a manually operative lever for opening and closing separable contacts in a circuit breaker and/or for turning power ON and OFF using a disconnect switch associated with a fuse (e.g., a fused disconnect). When a disconnect switch of the operating mechanism (e.g., circuit breaker) is ON (with contacts closed) and connected to a power bus, the unit is energized.

The terms "bucket assembly", "bucket", "control unit," and "unit" are used interchangeably and refer to a housing (typically a protective metal shell) that contains a disconnect switch, such as an isolation switch (for a bypass unit), a fused disconnect switch, or a circuit breaker (which can be manually operated by an operator mechanism) for controlling energization/de-energization of the power circuit in the unit. A unit can also include other components such as a power transformer, PLCs (programmable logic controllers), position sensors and the like.

The unit can be a motor starter unit, a feeder unit, a unit with a transfer switch or any other unit type. The term "motor starter" is used herein to refer to any starter type. The motor starter can be, for example, a variable frequency drive (VFD) (also known as a variable speed drive), a soft starter (reduced voltage starter), a NEMA starter (NEMA contactor and overload relay, or an IEC starter (IEC contactor and overload relay). The unit can comprise a feeder such as a feeder with a circuit breaker ("feeder breaker") or a feeder with a disconnect switch with a fuse ("feeder with fused disconnect switch"), a lighting contactor, a resistive contactor or an ATS (automatic transfer switch), by way of further example.

The term "disconnect switch" when used with respect to a unit refers to a switch in or on the unit for controlling energization or de-energization of the unit, including a circuit breaker or a switch for opening and closing separable contacts in, e.g., a circuit breaker and/or for turning power ON and OFF using a switch associated with a fuse (e.g., a fused disconnect). A disconnect switch can also include an isolation switch for the bypass unit. The disconnect switch can include an operator mechanism to permit manual operation of the circuit breaker or fused disconnect.

The terms "load" and "load device" are used interchangeably and are intended to mean devices that consume electrical power and that are connected to and controlled by the electrical power distribution system (e.g., a motor control center). Load devices are typically motors, but may also be pumps or other machinery that may comprise motors or pumps or other miscellaneous critical loads such as hospitals, dam emergency pumps, data centers, back-up generator systems and the like.

Figure 8:
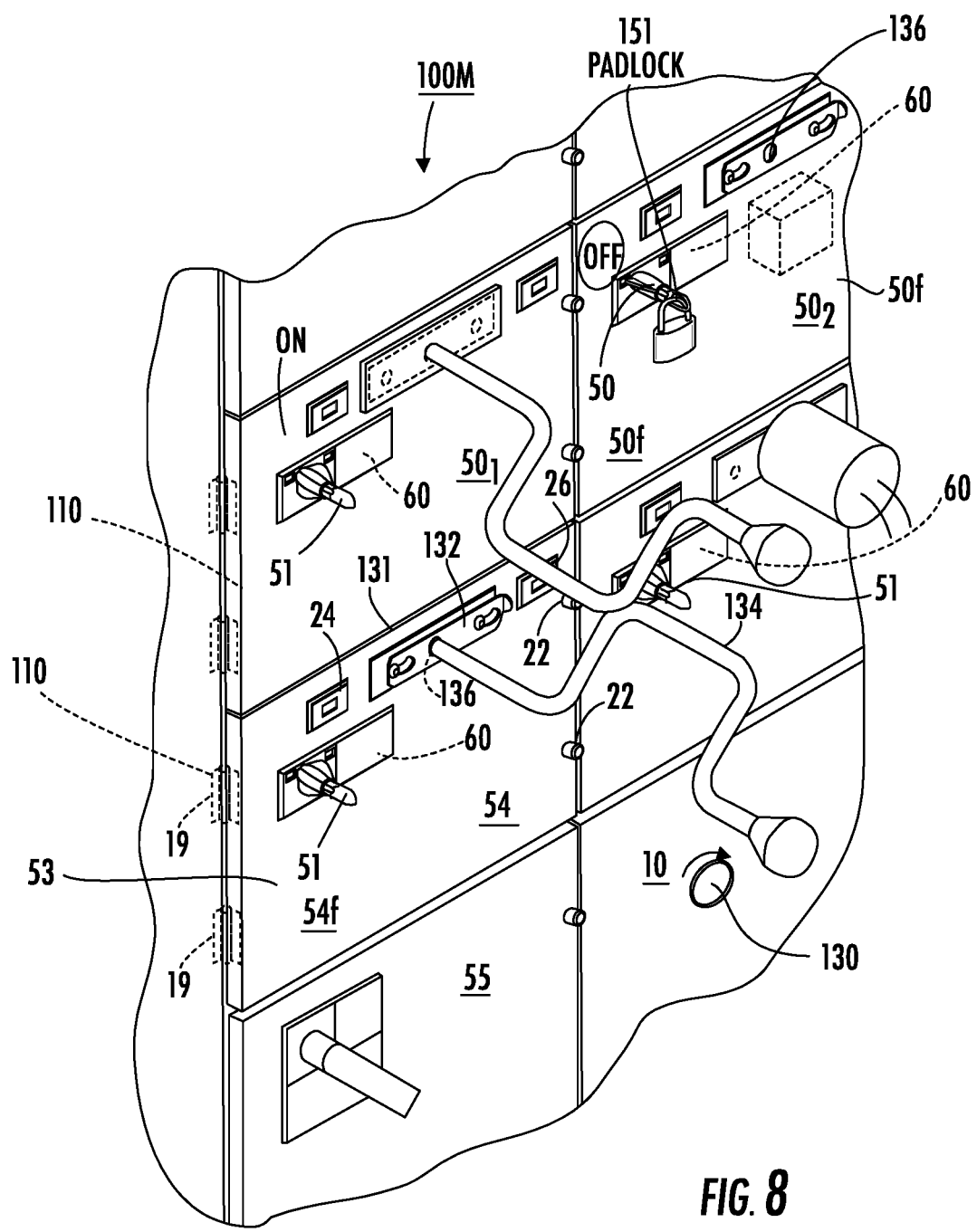
FIG. 8 is a partial front side perspective view of a motor control center (MCC) according to embodiments of the present invention.

Referring to FIG. 1, one embodiment of an electrical power distribution system 100 (e.g., a MCC) is shown. The electrical power distribution system 100 includes a structure with compartments 110, a wire way 100w (FIG. 4, for example), a common power bus 200, units $50_1$, $50_2$ and a bypass unit 10 for providing power from the power bus 200 of a power bus bar system 1000 (FIG. 4, for example) to an external load 80. The electrical power distribution system 100 can include more than two units $50_1$, $50_2$ and the bypass unit 10 as shown in FIG. 8, for example.

Embodiments of the invention can allow for electrical isolation of one of the units $50_1$, $50_2$, from the other of the units $50_1$, $50_2$, while the other unit is operational, online, and providing power to the load 80, thereby providing a continuous operational system while also providing increased safety for a technician. For example, since the primary or first unit $50_1$ is electrically isolated from the secondary or second unit $50_2$, a technician can access the first unit $50_1$ which is offline and electrically isolated from the second unit $50_2$, the power bus 200 (FIGS. 1, 4) and the load 80, while the second unit $50_2$ is operational, online, and providing power to the load 80, thereby providing a continuous operational system while also providing increased safety for a technician.

Embodiments of the invention can also provide for physical separation/isolation of the first and second units $50_1$, $50_2$ and the bypass unit 10 from each other in compartments 110 of the structure 100 using barriers such as partitions, walls, ceilings and floors, for example.

Figure 2A:
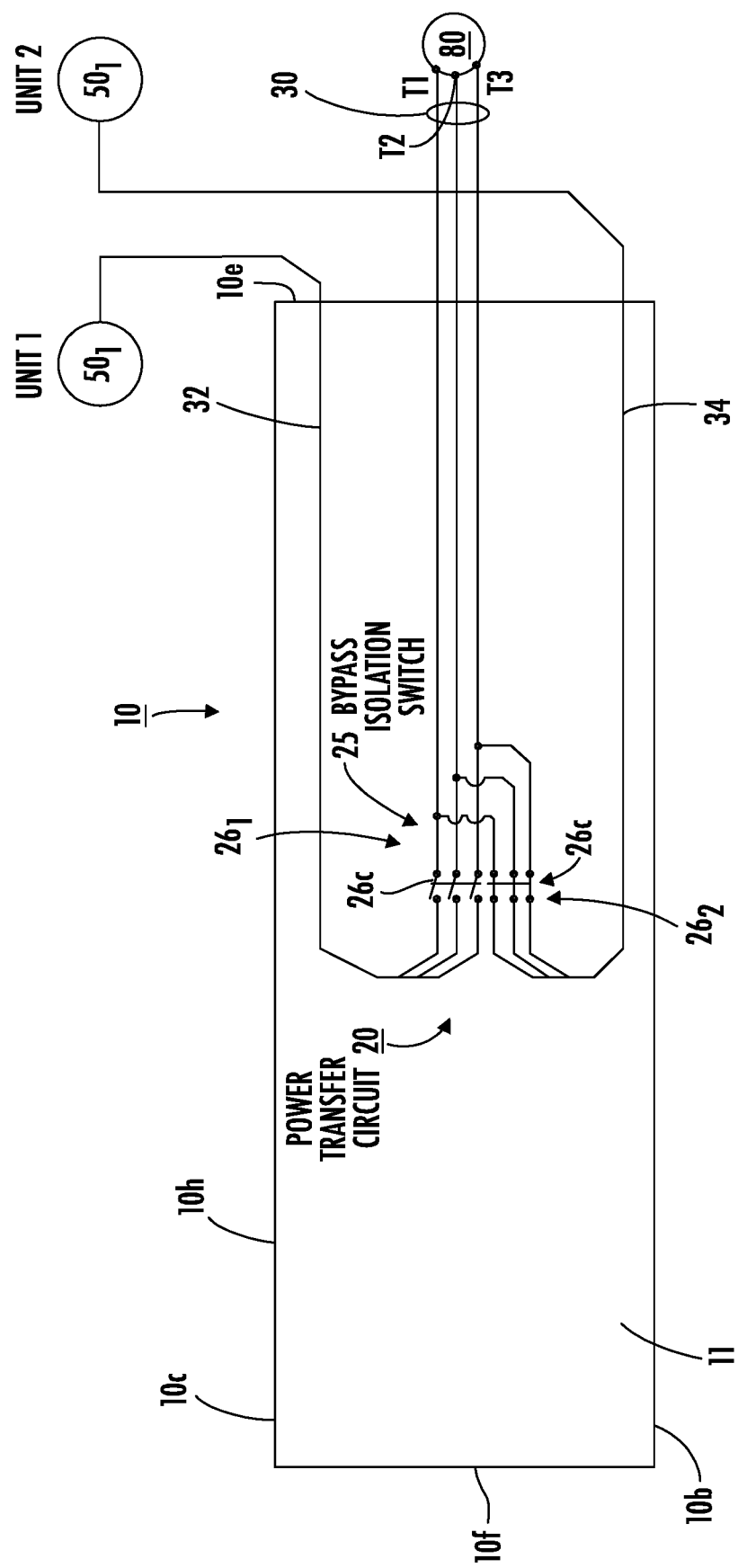
FIG. 2A is a schematic of an exemplary bypass unit according to embodiments of the present invention.

Referring to FIGS. 1 and 2A, the bypass unit 10 includes a housing 10h that encloses a power transfer circuit 20 with a bypass isolation switch 25. The power transfer circuit 20 is coupled to a load 80, e.g., a load side device such as a motor 80m (FIG. 2A), via a conductor 30, shown as a three pole/three phase lead with three electrical contact connections. The term "conductor" refers to one or more cables, each of which can include one or more wires, leads or other elements that conduct electricity, or one or more wires, leads, traces, lines or other elements that conduct electricity.

Figure 4:
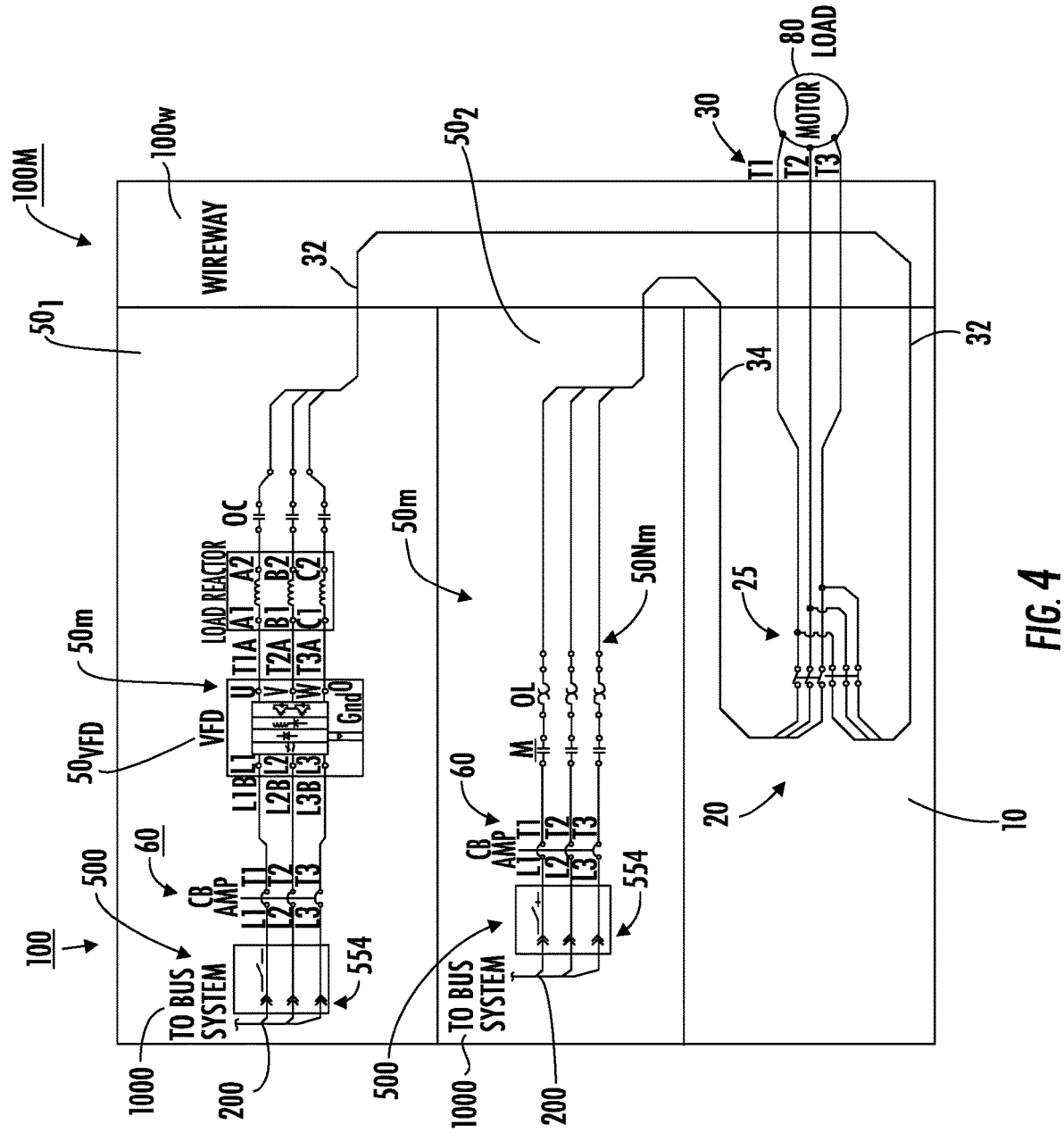
FIGS. 4-6 are schematic illustrations of electrical power distribution systems according to embodiments of the present invention.
Figure 5:
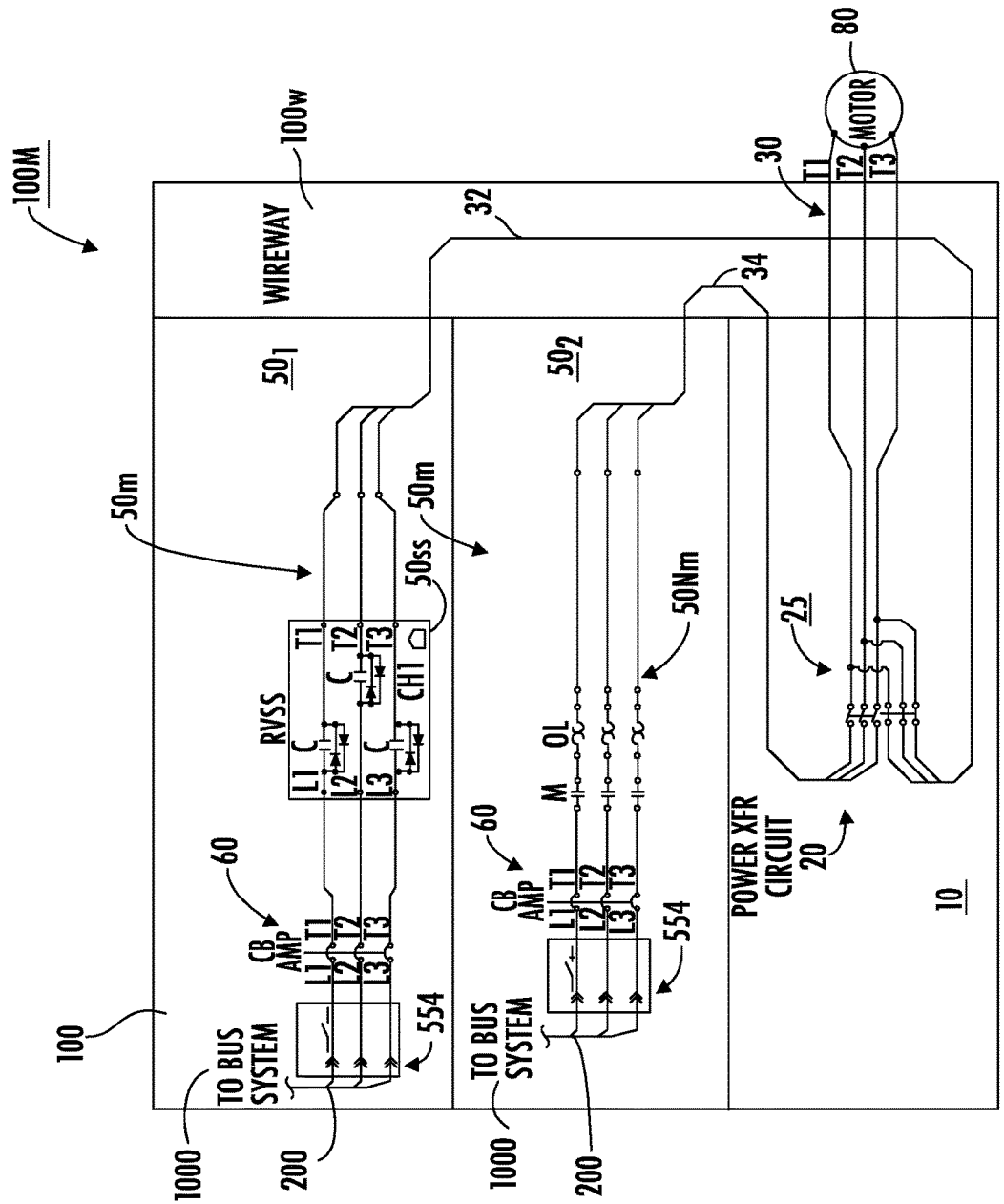
Figure 6:
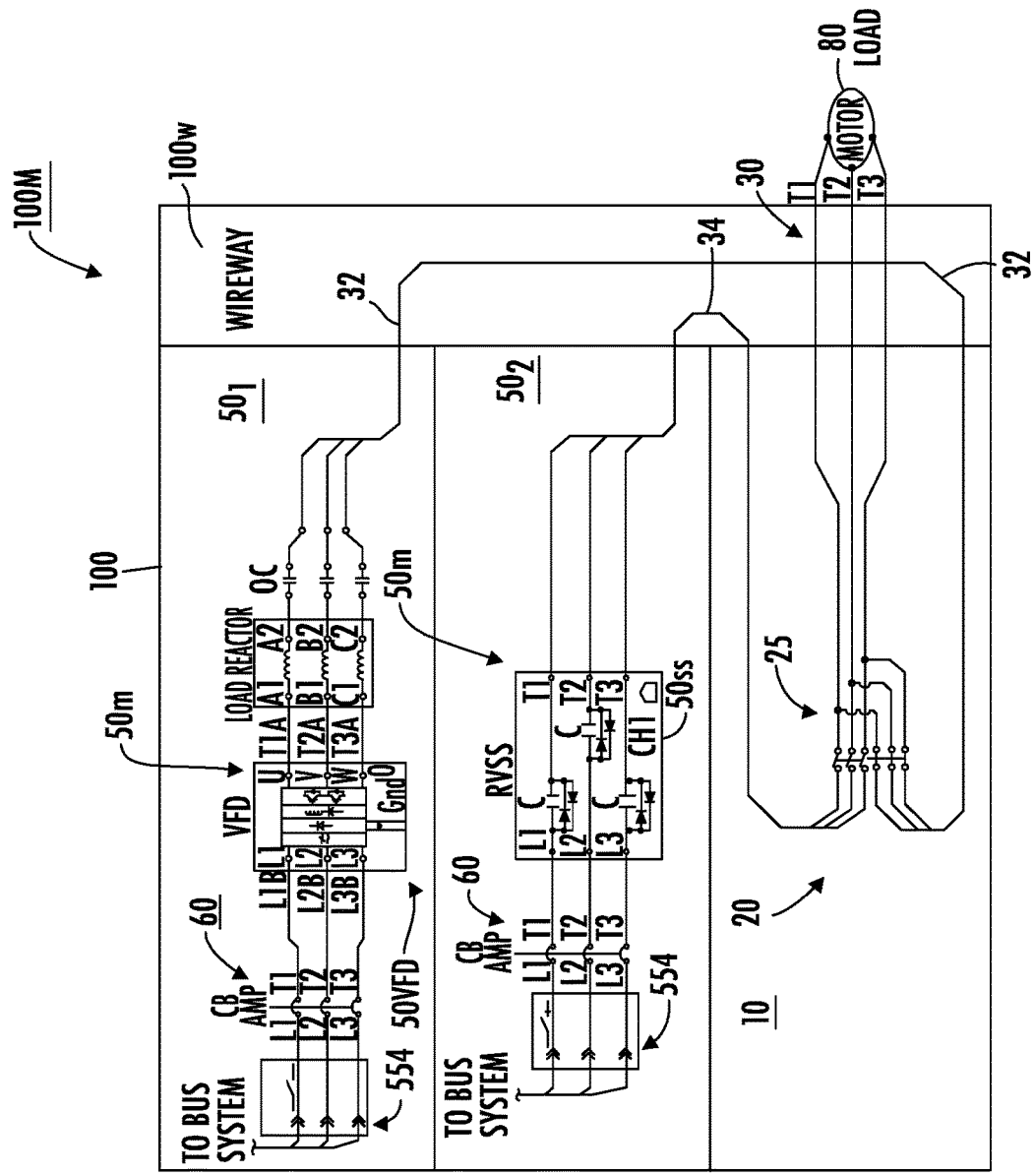

The power transfer circuit 20 is also electrically coupled to a first unit $50_1$ and a second unit $50_2$ (FIGS. 1, 3A, 3B, 4-6) via conductors 32, 34, respectively, and is configured to only electrically connect the load 80 to a single one unit of the first unit $50_1$ or the second unit $50_2$ at any one time during normal operation. The conductors 30, 32, 34 can be of the same or different lengths. The conductors 32, 34 can extend from the bypass unit 10 to the first and second units $50_k$, $50_2$, inside a wire way 100w of a structure 100, such as an MCC 100M (FIGS. 4-6).

Figure 2B:
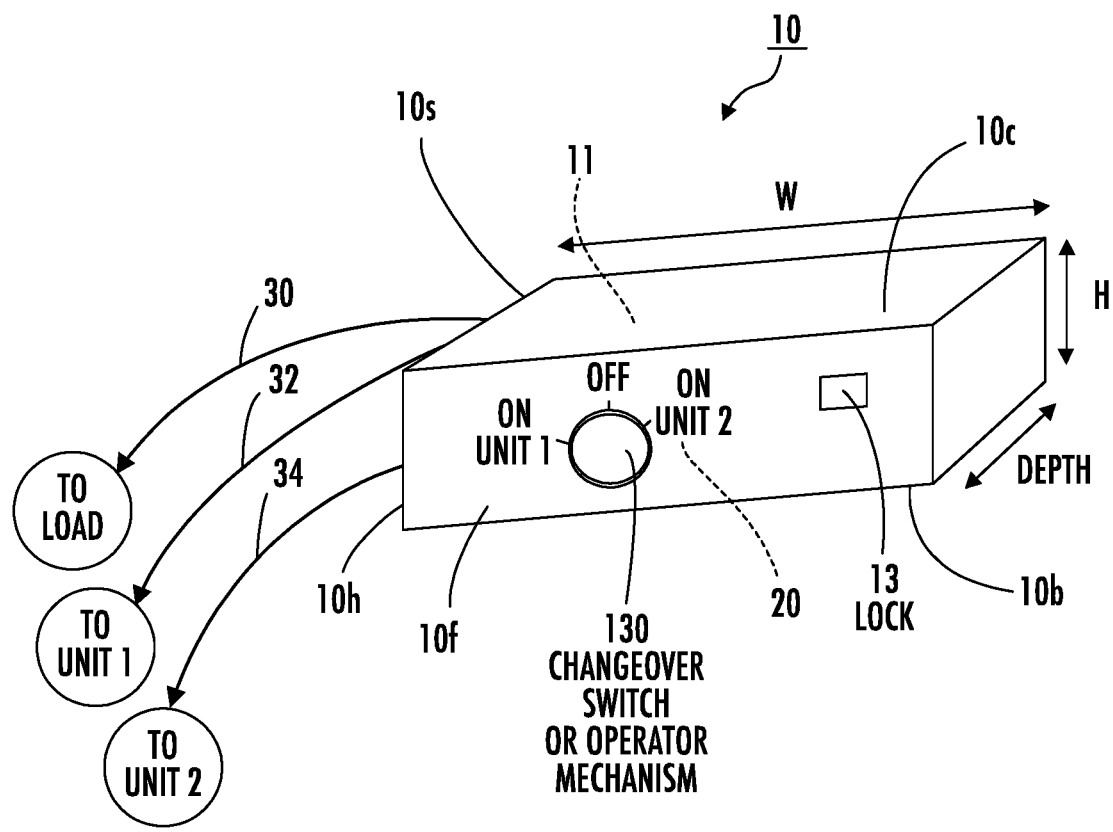
FIG. 2B is a front, side perspective view of the bypass unit shown in FIG. 2A according to embodiments of the present invention.
Figure 2C:
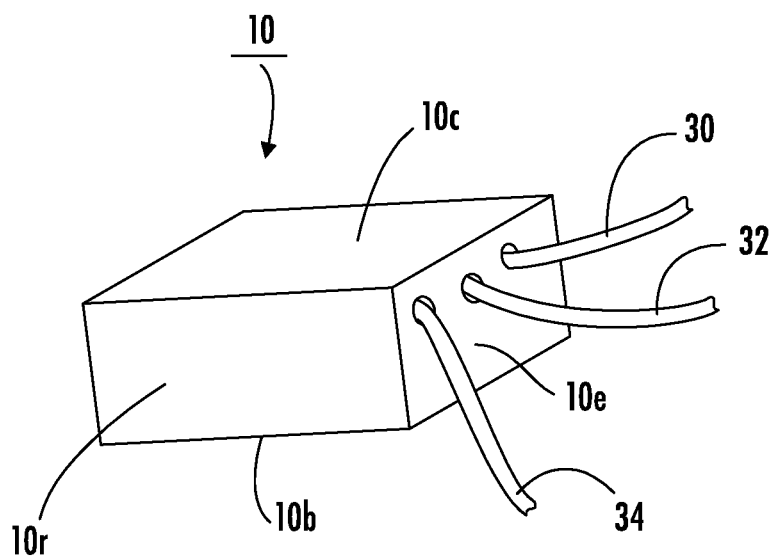
FIG. 2C is a rear, side perspective view of the bypass unit shown in FIG. 2A according to embodiments of the present invention.

As shown in FIGS. 2A and 2B, the bypass unit 10 has a front panel 10f, sidewalls 10s, a ceiling 10c, a floor 10b and a back wall 10r that defines an enclosed compartment 11 and does not require, and typically does not have, power stabs (for engaging a power bus) that extend out from the back wall 10r. A plurality of conductors 30, 32, 34 extend out of the housing 10h, typically one of the side walls 10s, shown as the right side wall 10e (FIG. 2B). The term "right side" refers to the orientation when held in a structure for normal operation with the front 10f facing forward. The incoming conductors (e.g., nine wires, three associated with each conductor 30, 32, 34) can be fed into the bypass unit 10 through one side of the unit and into a wire way 100w (FIG. 4) and the rear 10r of the housing 10h can be a closed panel. The bypass unit 10 can electrically isolate each of the first unit $50_1$ and the second unit $50_2$ from the load 80 and/or from each other while respective front panels 50f (FIGS. 1, 3A, 3B) remain closed and typically locked in the closed position.

In some embodiments, the housing 10h of the bypass unit 10 can define an enclosure with a solid back wall 10r with the conductors 30, 32, 34 extending from a common portion or different portions of the housing 10h via a ceiling, floor, sidewall or back wall. The housing 10h can be a 1× size housing (about 6 inches tall) of a 2× size housing (about 12 inches tall) in some embodiments.

It is contemplated that embodiments of the invention can comply with the recommendation of IEEE P1814 with respect to a reduced hazard requirement, which recommends a drive unit, such as a VFD unit, be isolated. Embodiments of the invention can provide a bypass unit that couples to both primary and secondary (redundant) units, which can comprise respective motor starters of the same or different motor starter types. Embodiments of the invention provide modular build options without requiring expensive, complex and larger cumbersome customizations for providing different build configurations while providing the bypass power transfer function.

In some embodiments, the technician can interchangeably replace a malfunctioning primary/first unit from the structure 100 of an electrical power distribution system (FIGS. 1, 3A, 3B) with a modular replacement unit of the same type (e.g., the same housing and build configuration with the same internal components) while the other (secondary/second) unit is operational.

As shown in FIG. 2B, the bypass unit 10 can include a user interface member 130 (which is typically a lever or handle of an operating mechanism) extending from the front panel 10f and connected to the power transfer circuit 20, typically directly coupled to the bypass isolation switch 25. The user interface member 130 can include, e.g., a rotary switch, that allows a user to select a first position that couples the first unit $50_1$ to the load 80, a second position that couples the second unit $50_2$ to the load 80, and an optional third position that concurrently disconnects the first unit $50_k$, the second unit $50_2$ and, optionally, also disconnects the bypass unit 10 from the load 80. Thus, there can be first and second "ON" positions and an optional "OFF" position, and, where used, the OFF position can be between the first and second ON positions as shown in FIG. 2B.

The user interface member 130 can be a switch handle that is manually operated and configured to receive a lock so as to be able to be physically locked (e.g., padlocked) in an OFF or ON position. Referring to FIGS. 2A and 2B, the user interface member 130 can have two ON positions, a first ON position to close a first set $26_1$ of (three) switch contacts 26c that couple to the first unit $50_1$ and the second ON position to close the other set $26_2$ of (three) switch contacts 26c that couple to the second unit $50_2$ to electrically selectively couple only a single one of the units $50_k$, $50_2$, The ON position is associated with the corresponding unit being energized providing an electrical path from the power bus 1000 (FIG. 4) through the selectively closed switch contacts 26c of the bypass unit 10 to a load 80 at any one time.

Still referring to FIG. 2B, the bypass unit 10 can also optionally include a lock 13 that locks the front panel 10f (which can be a front door that pivots open from a side) closed so that a technician cannot open the front panel or door 10f when the lock is deployed. The lock 13 can be a physical/mechanical or electromechanical interlock that locks the front panel or door 10f closed.

One or all of the units 10, $50_k$, $50_2$ (FIGS. 1, 3A, 3B) can be configured as a modular unit to allow the internal components to be assembled as a unit 10, $50_k$, $50_2$ that can be easily, typically slidably and replaceably, installed into a compartment 110 of a structure 100 (FIGS. 1, 3A, 3B) such as an enclosure, a cabinet, and/or a motor control center (MCC) 100M (FIGS. 4-6). Embodiments of the invention provide modular (plug and play) configurations which can provide economic advantages to known conventional custom bypass designs that are cumbersome and may not provide the additional electrical isolation allowed by embodiments of the present invention. To be clear, the term "modular" refers to units that have defined standardized dimensions so that one unit of one type is replaceably interchangeable with another unit of that type.

Referring again to FIG. 2A, the bypass unit 10 can be provided in package or frame sizes of about 6 inches to about 72 inches (tall) in a height dimension "H" with substantially common depth and width dimensions, known as 1× (6 inches) to 12× (72 inches) sizes. The sizes can be in single X increments, from 1×, 2×, 3×, 4×, 5×, 6×, 7×, 8×, 9×, 10×, 11× and 12×. Thus, a 5× unit 10 can be about 30 inches tall. In some embodiments, the bypass unit 10 can be a 1× unit with a height "H" of about 6 inches or a 2× unit with a height H of about 12 inches. The frame sizes can be provided for target operational amperages, including a plurality of: 125A, 150A, 225A, 250A, 400A, 600A, 1200A and 2000A, for example.

Figure 3A:
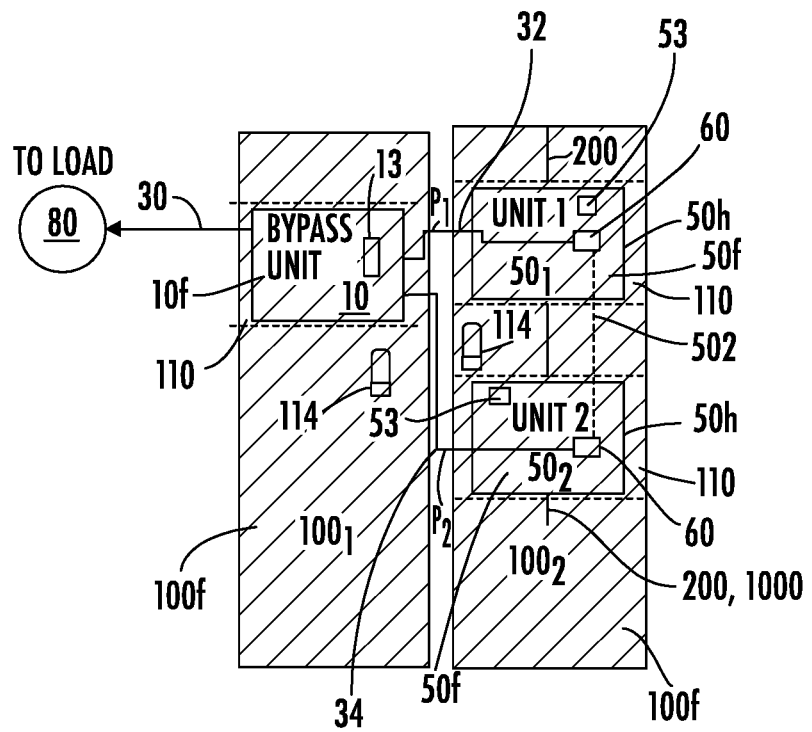
FIGS. 3A and 3B are box diagrams of electrical power distribution systems according to embodiments of the present invention.
Figure 3B:
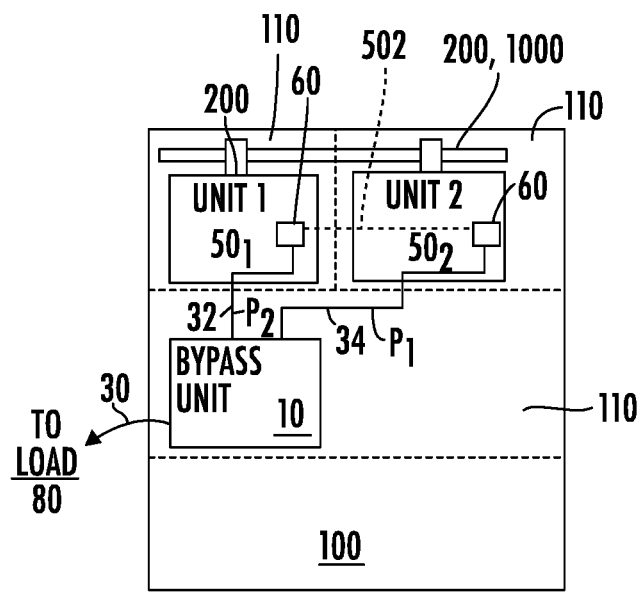

FIGS. 1, 3A and 3B illustrate that the bypass unit 10 can be placed in a compartment 110 of a structure 100 and concurrently attached via cables 32, 34 but selectively electrically coupled to the first unit $50_1$ and the second unit $50_2$. The first and second units $50_k$, $50_2$ can each be configured as a motor starter unit comprising a motor starter 50m (FIGS. 4-6) and a disconnect switch 60 for controlling energization and de-energization of the motor starter 50m. Each unit $50_k$, $50_2$ can include a front panel or door 50f.

The front door 50f of each unit $50_k$, $50_2$ may be configured to engage at least one lock 53 that, when deployed, can lock the door 50f in the closed position. The lock 53 can be a physical mechanical interlock.

Figure 7A:
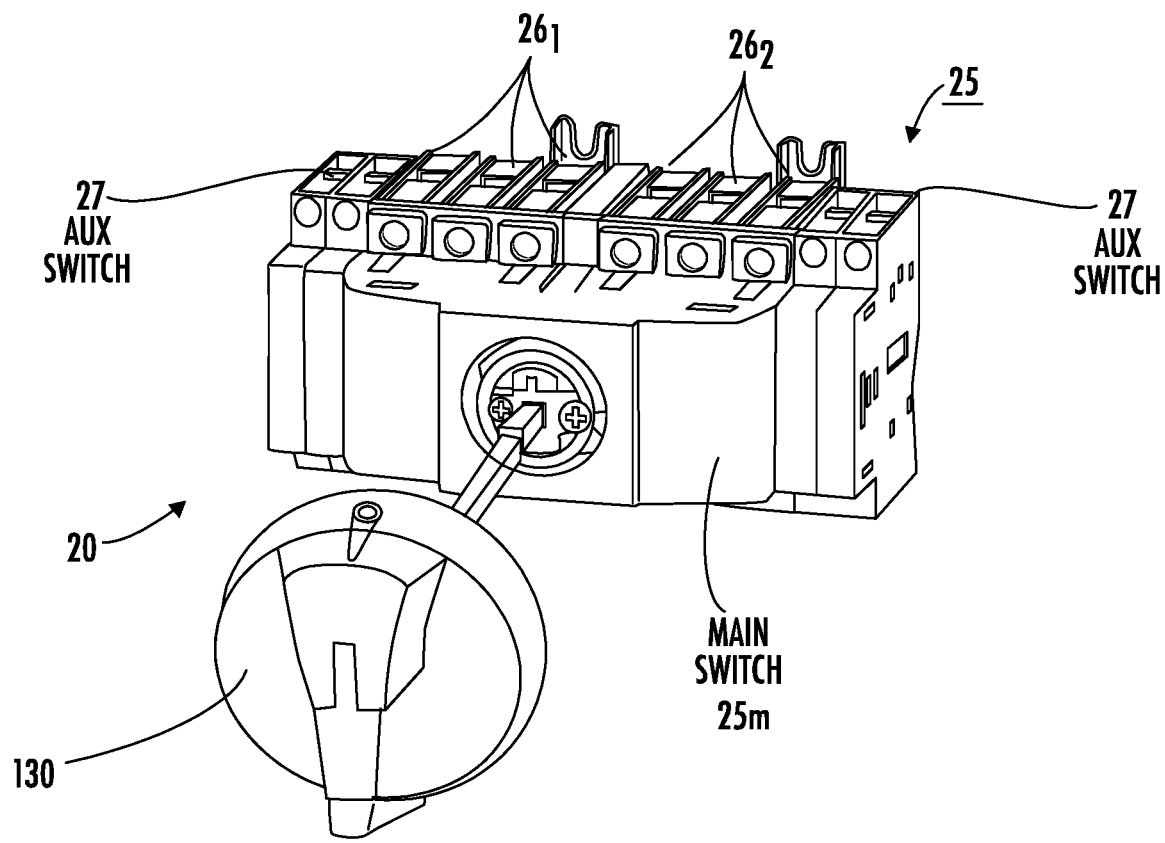
FIG. 7A is an enlarged front view of a transfer switch and deadfront switch handle suitable for the bypass unit shown in FIGS. 1 and 2A according to embodiments of the present invention.
Figure 7B:
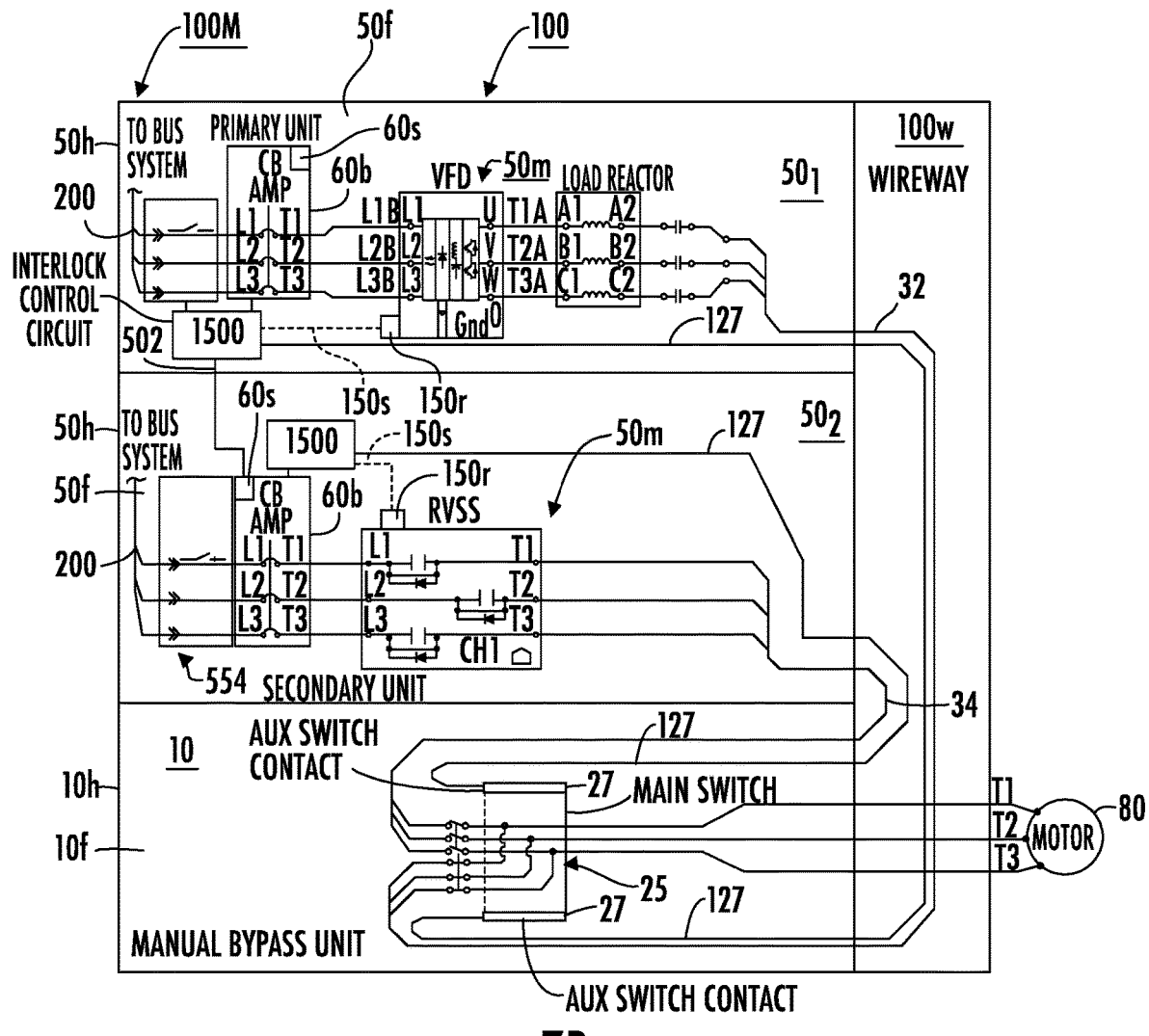
FIG. 7B is a schematic illustration of an electrical power distribution system according to embodiments of the present invention.

In some embodiments, each disconnect switch 60 of the first and second units $50_1$, $50_2$ includes a circuit breakers 60b with a shunt trip 60s as shown schematically in FIG. 7B. The terms "shunt trip" and "shunt trip coil" are used interchangeably herein and are well known components of circuit breakers.

The isolation switch 25 of the bypass unit 10 can be configured with open and closed switch states of each switch contact 26c (FIG. 2A) so that only one set $26_k$, $26_2$ of three switch contacts/poles 26c is electrically active and connected to one of the first and second units $50_1$, $50_2$ at any one time to provide either a first electrical path $P_1$ between a power bus 200, the first unit $50_k$, the bypass unit 10, and the load 80 or a second electrical path $P_2$ between the power bus 200, the second unit $50_2$, the bypass unit 10, and the load 80.

Referring to FIGS. 1, 2A, 2B, 3A, 3B, a conductor 502 can be coupled to the first and second units $50_k$, $50_2$ to permit signal communication therebetween, to thereby provide electrical interlocking functionality. For example, when a user selects the first unit $50_1$ to power the load by switching the user interface member 130 (e.g., operator handle of an operator mechanism) to an ON position and switching the isolation bypass switch 25 to Unit 1-ON position, the first unit $50_1$ (either or both the auxiliary switch of the circuit breaker 60b or the auxiliary relay 150r of the motor starter 50m) can transmit a trip signal to the circuit breaker 60b of the second unit $50_2$, typically via the shunt trip 60s (FIG. 7B). Likewise, the second unit $50_2$ can transmit a trip signal to the circuit breaker 60b of the first unit $50_k$, typically the shunt trip 60s (FIG. 7B), when the second unit $50_2$ is selected by the power transfer circuit 20 via the isolation bypass switch 25 to create the electrical path to power the load 80 via the bypass unit 10. This can provide an extra degree of safety via an electrical interlock system.

Referring to FIGS. 3A, 3B and 7B, the disconnect switch 60 of the first unit $50_1$ can electrically couple to the disconnect switch 60 of the second unit $50_2$. In some embodiments, the disconnect switch 60 of each of the units $50_k$, $50_2$ comprises or is a circuit breaker 60b. In certain defined conditions, the first unit $50_1$ can send a trip signal to the circuit breaker 60 of the second unit $50_2$ to cause the breaker shunt trip coil 60s to trip the breaker in the second unit $50_2$. In certain defined conditions, the second unit $50_2$ can send a trip signal to the circuit breaker 60b of the first unit $50_1$ to cause the breaker shunt trip coil 60s to trip the breaker in the first unit $50_k$.

The first unit $50_k$, for ease of discussion can be referred to as a "primary unit", and a second unit $50_2$, for ease of discussion can be referred to as a "secondary unit" that can be coupled to the bypass unit 10 for selectively powering a load 80 through the power transfer circuit of the bypass unit 10.

In some embodiments, an electrical power distribution system 100 (e.g., MCC) can include a plurality of different electrical interlocks to ensure that only one unit of units $50_1$, $50_2$ is energized and capable of providing power to the load 80 through the bypass unit 10 at any one time. FIG. 11 lists exemplary electrical interlocks. These defined conditions and associated actions can provide an electrical interlock system. FIG. 11 lists example actions of the first (primary) unit $50_1$, the second (redundant) unit $50_2$, and the bypass unit 10 providing an electrical interlocking system based on defined operative conditions or states of the first and second units $50_1$, $50_2$.

Example interlocks associated with a primary mode (when the first unit $50_1$ is powering the load 80 through the bypass unit 10) or a bypass mode (when the second unit $50_2$ is powering the load 80 through the bypass unit 10) are listed. The defined conditions can include positions of power stabs 554 optionally provided as retractable/extendable power stabs 546, 548, 550 of a power disconnect assembly 500 (FIGS. 9 and 10) whether the power stabs 546 are fully extended and connected to a power bus 1000 or retracted (FIGS. 4-6) based on position sensors 582, 594 such as one or more microswitches (FIG. 10) in the respective units $50_1$, $50_2$. Other conditions can be based on an energized status of a respective primary or secondary unit based on an auxiliary switch and/or auxiliary relay in each of the first and second units which can send a trip signal to the other unit. The bypass unit 10 can also send a trip signal to the primary $50_1$ or secondary unit $50_2$ depending on whether the bypass unit 10 is in the primary mode (trip signal to the secondary unit) or the bypass mode (trip signal to the primary unit).

However, while the power disconnect assembly 500 is believed to be desired for certain end applications/uses, it is not required in all motor starter units. For further description of position sensors using auxiliary switches such as microswitches in a unit with a power disconnect assembly 500, see U.S. 2008/0022673 (labeled as features 82 and/or 94 in FIG. 17 of this document), the contents of which are hereby incorporated by reference as if recited in full herein. For further descriptions of example power disconnect assemblies and interlocks, see also, U.S. patent application Ser. No. 15/848,103, the contents of which are hereby incorporated by reference as if recited in full herein.

Table 1 below provides a list of example configurations of the first unit/primary unit $50_1$ and the second unit/secondary unit $50_2$.

TABLE 1

UNIT COMBINATION OPTIONS

| Option | Primary Unit | Secondary unit |
|---|---|---|
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder with Fused Disconnect Switch | Feeder with Fused Disconnect Switch |

Referring to FIG. 7B, the trip signal for the electrical interlock system can be generated/transmitted via at least one interlock circuit 1500 that can include (a) one or more inputs for receiving a signal from an auxiliary switch 27 (FIG. 7A) of the bypass unit 10 via conductor 127 and (b) one or more input(s) for receiving a signal from the first and second units $50_k$, $50_2$ such as from an auxiliary switch or contact associated with the circuit breaker 60b of the disconnect switch 60 and/or an auxiliary relay 150r coupled to or in the motor starter 50m. As discussed above, the first and second units $50_k$, $50_2$ can be coupled via a conductor 502, for example. One or more of the outputs/signals from the auxiliary switch 27 and/or the interlock circuit 1500 can provide a voltage signal as a trip signal to a shunt trip 60s in a circuit breaker 60b of one of the first and second units $50_k$, $50_2$ when the other unit of the first and second units $50_k$, $50_2$ has a circuit breaker 60b that is energized.

Still referring to FIG. 7B, each motor starter 50m can be coupled to an auxiliary relay 150r that can transmit a trip signal 150s to the interlock circuit 1500. For example, when a motor starter 50m of one of the first and second units first and second units $50_1$, $50_2$ is on and/or operating, an auxiliary relay 150r can transmit a voltage trip signal 150s to the circuit breaker 60b of the other unit to make sure that the other unit is off, contacts open, as a safety interlock feature.

In some embodiments, the auxiliary relay 150r of the motor starter (e.g., soft starter) 50m, the auxiliary switch 27 of the bypass unit 10 and an auxiliary switch 60s in the breaker 60b of first unit $50_1$ can be synchronized and/or transmit in parallel, trip signals to the second unit $50_2$ when the first unit $50_1$ is energized. The auxiliary relay 150r of the motor starter (e.g., soft starter) 50m, the auxiliary switch 27 of the bypass unit 10 and the auxiliary switch 60s in the breaker 60b of the second unit $50_2$ can be synchronized and/or transmit in parallel trip signals to the first unit $50_1$ when the second unit $50_2$ is energized.

The term "auxiliary switch" for the primary unit and the secondary unit in FIG. 11 that can send the trip signal(s) to the appropriate breaker can include one or more auxiliary switches including, for example, an auxiliary switch 582, 594 (FIG. 10) identifying a position of the retractable/extendable power stabs, an auxiliary switch of a circuit breaker 60b (FIG. 7B) associated with a contacts closed condition, or an auxiliary relay 150r (FIG. 7B) of a motor starter 50m indicating an motor on condition.

The structure 100 can be designed to slidably receive multiple units 10, $50_1$, $50_2$ in various defined sizes. For example, the first and second units $50_1$, $50_2$ can each have housings 50h of the same or different modular heights (i.e., 1×-12× frame sizes as discussed above). Each housing 10h, 50h can include a front door 10f, 50f that can remain closed when a respective unit is energized. Only one of the two units $50_1$, $50_2$ can be energized when connected to the power bus bars 200 and connected to the load 80 via the bypass unit 10 at any one time. When de-energized, one of the front doors 50f of the two units $50_1$, $50_2$ can be opened to allow a technician access to replace or repair that unit while the other of those two units $50_1$, $50_2$ is energized but electrically isolated from the de-energized unit and the bypass unit 10.

FIG. 3A illustrates that the bypass unit 10 can be placed in a first structure $100_1$ while the first unit $50_1$ and the second unit $50_2$ are in a separate, but typically adjacent, structure $100_2$. Each structure 100 can optionally have a front door 100f (shown by the shading over the respective units) that closes and releasably locks via at least one mechanical lock 114 in the closed position over one or more of the units $50_k$, $50_2$ and 10, respectively.

FIGS. 1 and 3B illustrate that the bypass unit 10 and the first and second units $50_1$, $50_2$ are held in the same structure 100. FIG. 3B illustrates that the units $50_1$, $50_2$ can be held in side by side, laterally adjacent compartments 110. FIG. 1 illustrates that the bypass unit and the first and second units $50_k$, $50_2$ can be held in a vertically stacked arrangement of compartment 110.

Referring again to FIG. 1, each compartment 110 can have a closed floor 110f and/or ceiling and/or rails 112 coupled to internal sidewalls 110*l* that slidably receive and support the units 10, $50_k$, $50_2$.

Referring to FIGS. 4-6, the first and second units $50_k$, $50_2$ can have power stabs 554 extending rearward from the back 50r that connect to one or more (typically vertically oriented) power bus bars 200 that are part of a power bus system 1000 that carries power (current) to the compartments of a vertical section in the structure such as the MCC 100M. These power stabs 554 may optionally be provided by a power disconnect assembly 500 as discussed above. As is well known, the bus bars 200 can be connected to larger (typically horizontal bus bars) that bring power to the vertical sections. The larger (typically horizontal) bus bars are usually in the top, but some structures may have them in the center or bottom. The structures of MCCs 100M usually have at least one wireway 100w for conductors 30, 32, 34 (i.e., wires) to the load(s) and control cables and/or wires.

FIG. 4 illustrates an MCC 100M with the bypass unit 10 and a first unit $50_1$ that can comprise a VFD $50_{VFD}$ as the motor starter 50m and can also comprise power stabs 554, shown as provided by a power disconnect assembly 500. FIG. 4 also illustrates that the second unit $50_2$ can comprise a NEMA starter $50_{Nm}$ as the motor starter 50m and can also comprise power stabs 554, shown as provided by a power disconnect assembly 500. The microswitches 582 and/or 594 (FIG. 10) can identify when the stabs 554 are fully engaged to the (vertical) power bus 200 and when the stabs 554 are fully withdrawn and isolated from the (vertical) bus 200.

FIG. 5 illustrates an MCC 100M with the bypass unit 10 and a first unit $50_1$ that can comprise a soft starter $50ss$ as the motor starter 50m and can also comprise power stabs 554, shown as provided by a power disconnect assembly 500. FIG. 5 also illustrates that the second unit $50_2$ can comprise a NEMA starter $50_{Nm}$ as the motor starter 50m and can also comprise power stabs 554, shown as provided by a power disconnect assembly 500. The position sensors 582 and/or 594 (FIG. 10) can identify when the stabs 554 are fully engaged to the (vertical) power bus 200 and when the stabs 554 are fully withdrawn and isolated from the (vertical) power bus 200.

FIG. 6 illustrates an MCC 100M with the bypass unit 10 and a first unit $50_1$ that can comprise a VFD $50_{VFD}$ as the motor starter 50m and can also comprise power stabs 554, shown as provided by a power disconnect assembly 500. FIG. 6 illustrates that the second unit $50_2$ can comprise a soft starter 50ss as the motor starter 50m and can also comprise power stabs 554, shown as provided by a power disconnect assembly 500. The position sensors (e.g., microswitches) 582 and/or 594 (FIG. 10) can identify when the stabs 554 are fully engaged to the (vertical) power bus 200 and when the stabs 554 are fully withdrawn and isolated from the (vertical) bus 200.

Thus, as shown by the examples of FIGS. 4-6, modular units $50_k$, $50_2$ of different motor starter configurations can allow a number of different MCC build selections and/or configurations without requiring unique more expensive custom units.

Referring to FIG. 7A, the bypass isolation switch 25 of the bypass unit 10 can comprise a six pole isolation switch with a first set of three poles $26_1$ coupled to the first unit $50_1$ and a second set of three poles $26_2$ electrically coupled to the second unit $50_2$. The switch 25 can include a main switch body 25m with the six poles and one or more auxiliary switches 27, typically at least one auxiliary switch on each opposing end or side of the main switch body 25m.

The auxiliary switches 27 can be configured to receive and/or transmit signals from and/or to the first unit $50_1$ and the second unit $50_2$. For example, one or more of the auxiliary switches 27 can transmit a trip signal to the circuit breaker 60b of the disconnect switch 60 of one of the first unit $50_1$ or the second unit $50_2$ either or both (a) when the other of the first unit $50_1$ or the second unit $50_2$ is energized with the stabs 554 contacting the power bus 200 or (b) when the bypass switch 25 connects the first or second set of switch contacts 26c to be in the bypass mode whereby the aux switch 27 sends a trip signal to the primary unit $50_1$ or the primary mode whereby the aux switch 27 sends a trip signal to the secondary unit $50_2$. A respective auxiliary switch 27 can be coupled to one or both units $50_k$, $50_2$ via a conductive cable 127 (e.g., wire(s)) (FIG. 7B).

As also shown in FIG. 7B, the first and second units $50_1$, $50_2$ can be electrically coupled via one or more conductors 502 so that the first unit $50_1$ can send a trip signal to the second unit $50_2$ when the first unit $50_1$ is connected to the power bus bars 200. Similarly, the second unit $50_2$ can send a trip signal to the first unit $50_1$ when the second unit $50_2$ is connected to the power bus bar 200. In some embodiments, the trip signal can be generated by an auxiliary switch 60s (FIG. 7B) in a respective unit $50_k$, $50_2$ and/or a microswitch assembly associated with a position sensor 594 and/or 582 (FIG. 10) associated with one of the units with a power disconnect assembly 500 when the stabs of one of the units $50_k$, $50_2$ are fully extended and the stabs of the other unit are not extended (i.e., are retracted).

By way of example only and without limitation, an example isolation switch 25 is an R5 series six pole isolation switch (UL 508) non-fusible 16A-80A rotary disconnect that comprises a (rotary) user interface handle as the user interface member 130.

FIG. 7B illustrates that the structure 100, optionally an MCC 100M, can comprise the bypass unit 10 coupled to the first unit $50_1$ and the second unit $50_2$. Each unit 10, $50_k$, $50_2$, can be in separate housings 10h, 50h and placed in separate compartments of the structure 100. Each housing 10h, 50h can have a closed front panel or door 10f, 50f.

FIG. 8 illustrates an example MCC 100M with the first and second units $50_k$, $50_2$ and the bypass unit 10. The first and second units $50_k$, $50_2$ include operator handles 51 that are coupled to internal disconnect switches 60, such as circuit breakers, as is well known to those of skill in the art. The bypass unit 10 includes a user interface member 130 (deadfront switch operable through a closed door) which can be a rotary handle that is coupled to the power transfer circuit 20 (FIG. 1) to allow an operator to select to connect power from a load 80 to a single one of the first unit $50_1$ or the second unit $50_2$ and power bus 200.

The user interface member 130 can be configured to have three defined positions for defined ON and OFF states, a primary ON position, a primary OFF position and a bypass ON position. The user interface member 130 can be locked, such as padlocked, in one or both of the bypass ON and primary ON position, and can be interlocked to the door in one or both of the primary and bypass ON positions, and a door of the unit 10 can be locked closed when in an ON position.

Still referring to FIG. 8, a typical MCC structure 100M is an enclosure with a number of small doors arranged in rows and columns along the front and flat, mostly featureless, back and sides. The units 10, 50 can be provided in varying sizes. For starter units 50₁, 50₂, the size can be based on the size of the load 80, e.g., motor 80m (FIG. 2A) they are controlling. The units 10, 50₁, 50₂ can be configured to be relatively easily removable for repair, service or replacement. MCCs 100M can have different sets of units, for example, regular starters, reversing starters, soft start, and variable frequency drives. MCCs 100M can be configured so that sections can be added for expansion if needed.

MCCs 100M can be configured in many ways. Each compartment 110 can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors and/or feeder circuits. Several may be powered from main switchgear which, in turn, gets its power from a transformer attached to the incoming line from a public or private grid, e.g., a power company.

Referring to FIG. 8, a partial perspective view of a motor control center structure 100M is shown. Units 10, 54, 50ₖ, 50₂ are shown fully installed into a motor control center compartment 110 such that its respective front panel 10f, 54f, 50f is seated securely against the periphery of the compartment enclosure and flush with the front panel 54f of unit 54 and with the front panel 50f of units 50ₖ, 50₂.

In some embodiments, some or all units, e.g., units 54, 55, 50ₖ, 50₂ can include a number of latching mechanisms 22 on front panels thereof so that an operator may lock a unit into place once installed. In some embodiments, the front panel 50f, 54f may be a deadfront door having a set of hinges 19 in order to permit access to motor control components within a unit while the unit is installed in a compartment 111 of the MCC 100M. However, even when closed or sealed, front panel or door 50f still permits access to the disconnect switch 60 which can comprise a circuit breaker, stab indicator 24, shutter indicator 26, and line contact actuator 31. Line contact actuator 31 is a mechanism of the power disconnect assembly 500 (FIG. 9) for selectively engaging a power bus 200 to engage power stabs 554 defining line contacts (FIG. 4) with line power from the MCC 100M. Thus, even when a unit 10, 50 is fully installed in a compartment 110 and latches 22 have been secured, an operator may still use respective switch handles 51, 130.

As shown in FIG. 8, the first unit has the handle 51 in an ON position associated with conduction and an energized state while the second unit 50₂ has the handle 51 in an OFF position associated with non-conduction and a de-energized state and the handle 51 can engage a lock 151 such as a padlock to lock the unit 50₂ in this state.

For units with the power disconnect assembly 500, a user can also open slide 132 to insert crank 134 to move one or more line contacts (not shown) of the unit. When slide 132 is moved laterally aside to permit access to actuating mechanism 131, door 50f is prevented from opening, thereby closing off access to components inside the unit 50ₖ, 50₂. Additionally, a user may desire to padlock 232 the slide 132 in the closed position (FIG. 14B), to further regulate who may operate actuating mechanism 131 and when.

When slide 132 is moved aside, an aperture 136 (FIG. 9) is exposed. Opening 36 accepts a crank 134. Additionally, when slide 132 is moved aside as shown, slide 132 may optionally extend over a portion of front panel 50f. Thus, in embodiments in which front panel 50f is a hinged door, moving slide 132 to expose aperture 136 will inhibit a user from opening front panel 50f. Accordingly, so long as an operator has a crank 134 inserted into aperture 136 aligned with the internal actuator 131, the operator cannot open the door of the unit 50ₖ, 50₂.

Figure 9:
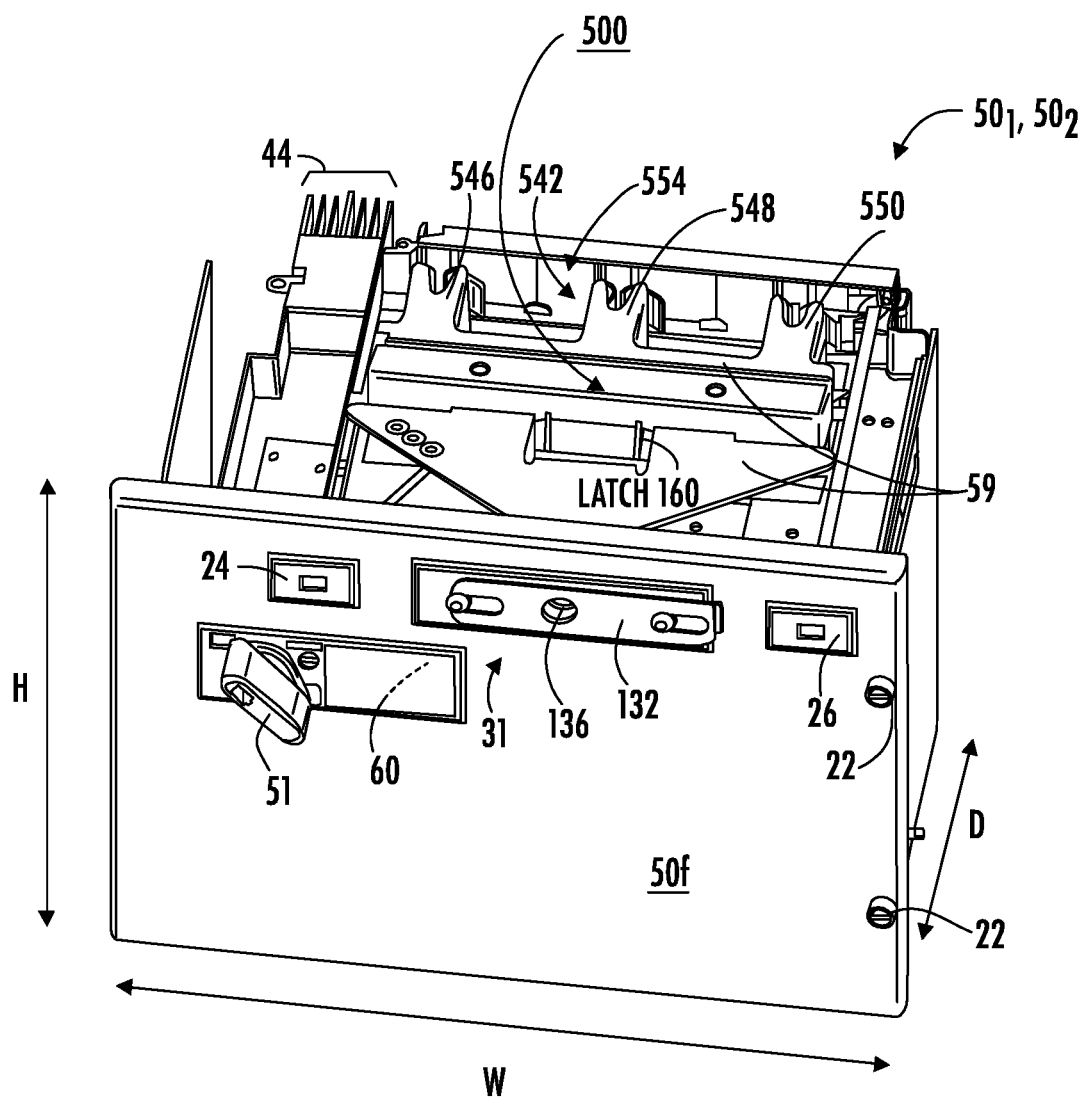
FIG. 9 is a top, side perspective view of an example unit with power stabs according to embodiments of the present invention.
Figure 10:
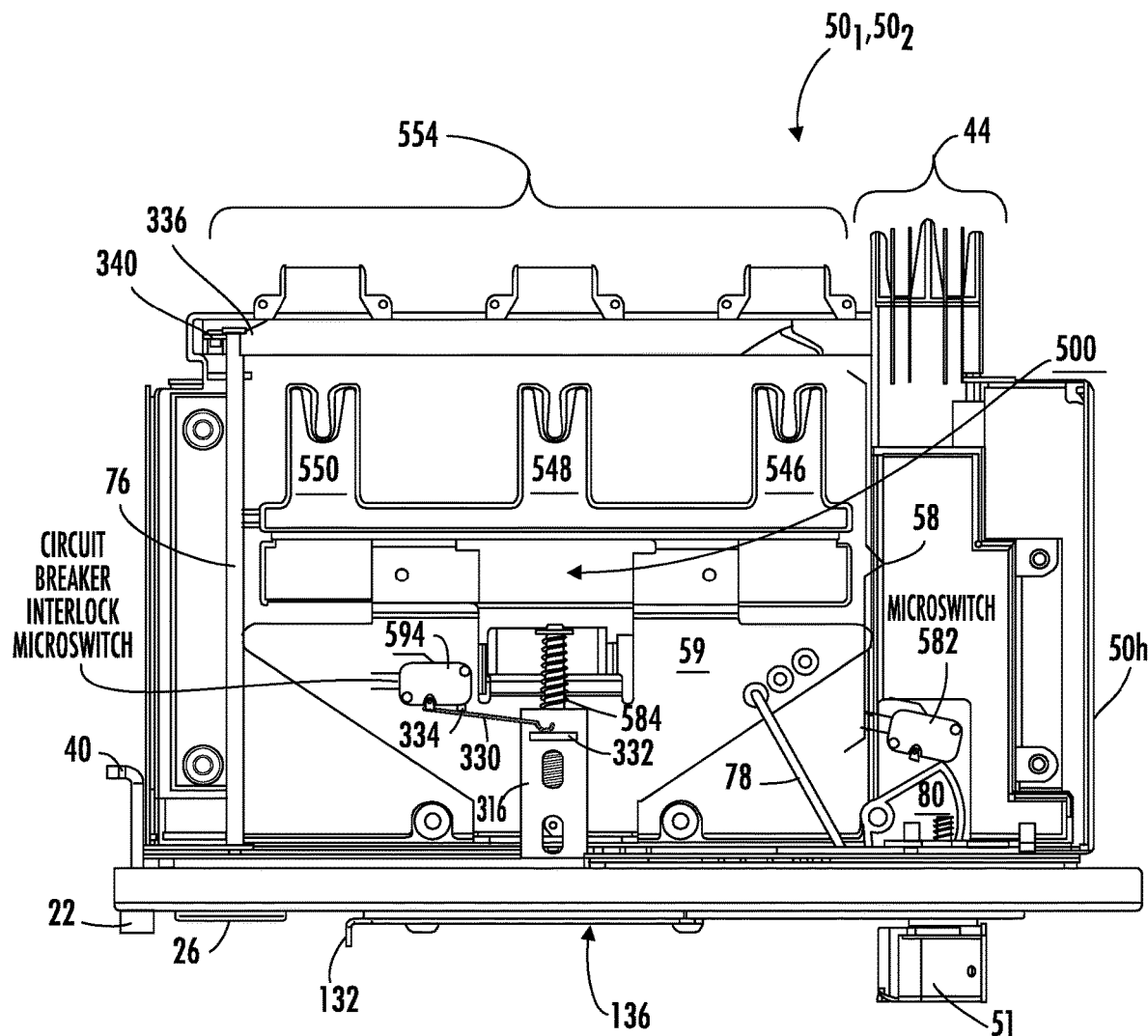
FIG. 10 is a bottom view of the example unit shown in FIG. 9 according to embodiments of the present invention.

FIGS. 9 and 10 show an example unit 50ₖ, 50₂ with an operator handle 51 coupled to the disconnect switch 60 and a power disconnect assembly 500 with retractable/extendable power stabs 554. During the extension of the power disconnect assembly 500 with the stabs 554 an automatic latch 60 can be triggered to engage the compartment 110 into which unit 50ₖ, 50₂ has been installed. Also due to the extension of the power disconnect assembly 500, a rod 78 is pulled by a stab bracket 59 such that a cam 80 is rotated away from a microswitch 582. Microswitch 582 is thus actuated to permit control voltage from a control power contact 44 to a motor control component, such as a contactor or overload relay (not shown). It is appreciated, however, that the position sensor assembly using the microswitch 582, cam 80 and rod 78 can be provided in other manners.

Also shown in FIG. 10 a second microswitch 594 can be connected to activate and deactivate a disconnect switch 60 such as a circuit breaker. When stabs 546, 548, 550 reach the fully engaged position with bus bars 200, stab bracket 59 actuates microswitch 594. When actuated, microswitch 594 permits closure of the disconnect switch 60, completing the circuit between bus bars 200 and the line side of motor control components (not shown) in unit 50ₖ, 50₂. Otherwise, microswitch 594 can prevent closure of its disconnect switch 60, e.g., circuit breaker. The microswitch 594 of the first unit 51 can send a trip signal to the disconnect switch 60 of the second unit 50₂ when the microswitch 594 permits closure of its disconnect switch to trip the disconnect switch 60 in the second unit 50₂ (and vice versa). This can be the signal transmitted via conductor 502 (FIGS. 3A, 3B, 3C, 7B).

Control power stab 44 can be un-shielded and connected to a control power once a respective unit 50₁, 50₂ is installed into a motor control center. However, microswitch 582 is in an activated state, due to the pressure thereon by cam 80. When microswitch 582 is in the activated state, as shown, microswitch 582 is interrupting control power from contact 44. Thus, the motor control components (not shown) housed in the unit housing 50h cannot initially be operated. Cam 80 will be moved by rod 78 via advancement of stab bracket 59, deactivating microswitch 582 and thereby permitting the flow of control power to motor control components (not shown) of the unit. Cam 80 also acts to display a location status of the stabs 546, 548, 550 to an operator. Cam 80 can have a number of colors thereon which can be displayed through front door 50f of the unit via stab indicator 24 (FIG. 8).

In the embodiment shown in FIG. 10, a disconnect switch (e.g., circuit breaker) interlock 316 includes microswitch 594, which gates the operation of the disconnect switch 60. FIG. 10 shows microswitch 594 in a deactivated state, in which button 334 thereof is not depressed. Arm 330 of microswitch 594 is positioned to abut a ledge 332 of interlock 316. Thus, when disconnect switch interlock 316 moves, due to the motion of stab assembly 58, the arm 330 of microswitch 594 will pivot, depressing button 334. When button 334 is depressed, microswitch 594 will be activated and will electrically allow operation of the disconnect switch (FIGS. 4-6).

FIG. 9 also has height "H", width "W" and depth "D" dimensions which may be provided in modular frame sizes of 1×-12× as discussed above with respect to the bypass unit 10. In some embodiments, the bypass unit 10 has a height that is less than the height of the units 50ₖ, 50₂. The bypass unit 10 and the units $50_k$, $50_2$ can have common depth and width dimensions. In other embodiments, the units $50_k$, $50_2$ can have common depth and width dimensions and the bypass unit 10 can have a different depth and/or width dimension.

Also shown in FIG. 10 is a shutter arm 336, having a sloped end 338. As stab 546 is advanced, stab 546 will engage the sloped end 338 and slide past shutter arm 336, thereby shifting shutter arm 336 to the left, as depicted in FIG. 10. When shutter arm 336 is shifted, it will strike a tab 340 of a rod 76 extending in a front to back direction of the unit. When tab 340 is struck, rod 76 will rotate, changing the color showing on shutter indicator 26 through door 50f of a respective unit $50_k$, $50_2$.

The electrical power distribution systems 100 (e.g., MCCs) contemplated by embodiments of the invention can optionally include one or more mechanical interlocks. FIG. 12 lists example mechanical locks that can optionally be used to provide a mechanical interlocking system to ensure that only one unit of units $50_k$, $50_2$, is energized and capable of providing power to the load through the bypass unit 10 at any one time.

The user interface member 130 of the bypass unit 10 providing a lever of a unit operating mechanism can be padlocked or otherwise locked into a primary mode when powering the load through the first unit $50_1$ or the bypass mode when powering the load through the second unit $50_2$.

For embodiments where units $50_k$, $50_2$ comprise the optional power disconnect assembly 500 (FIGS. 4-6, 9, 10), when one unit is energized, the other unit can be padlocked via padlock 132 (FIG. 14B) or a padlock that locks the operator mechanism 130 to lock the unit that is not being used to power the load to lock the power disconnect assembly 500 with its stabs in a retracted state with the slide 32 (FIGS. 8, 9) misaligned from portal 36 and can also padlock the operator mechanism 130 in the off/open contacts position.

Figure 13A:
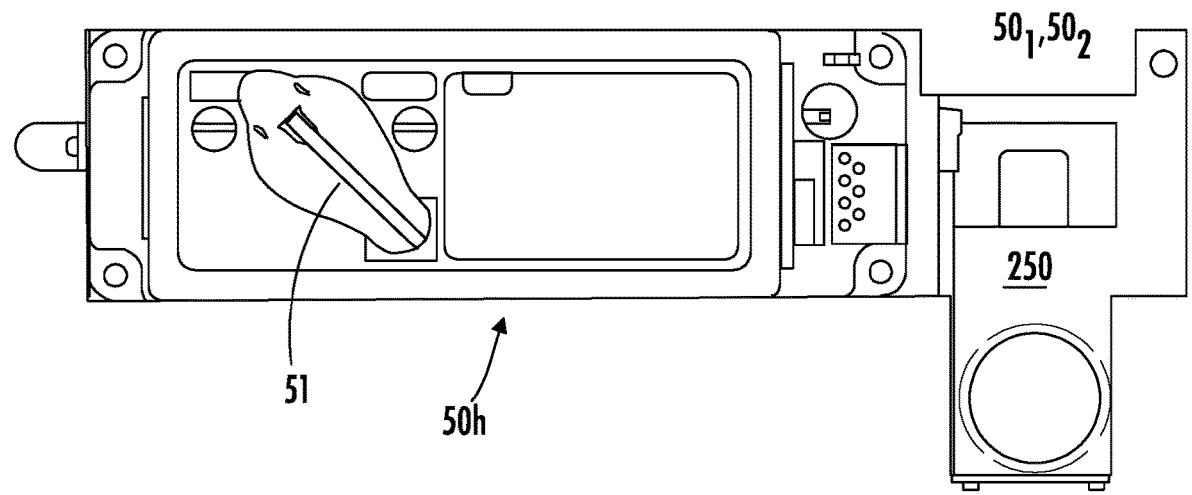
FIG. 13A is a partial front view of a front panel segment of an example unit with a keyed interlock according to embodiments of the present invention.
Figure 13B:
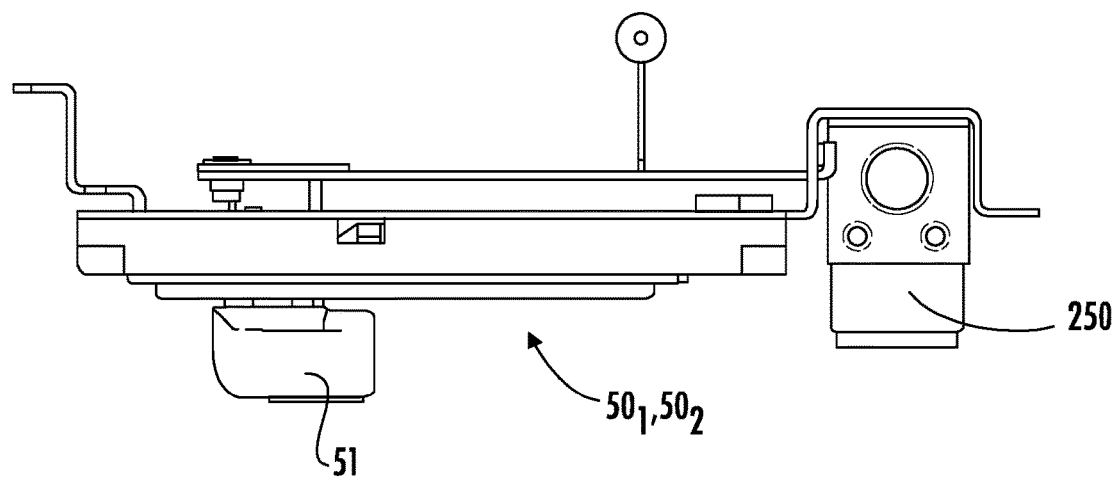
FIG. 13B is a top view of the device shown in FIG. 13A.
Figure 14A:
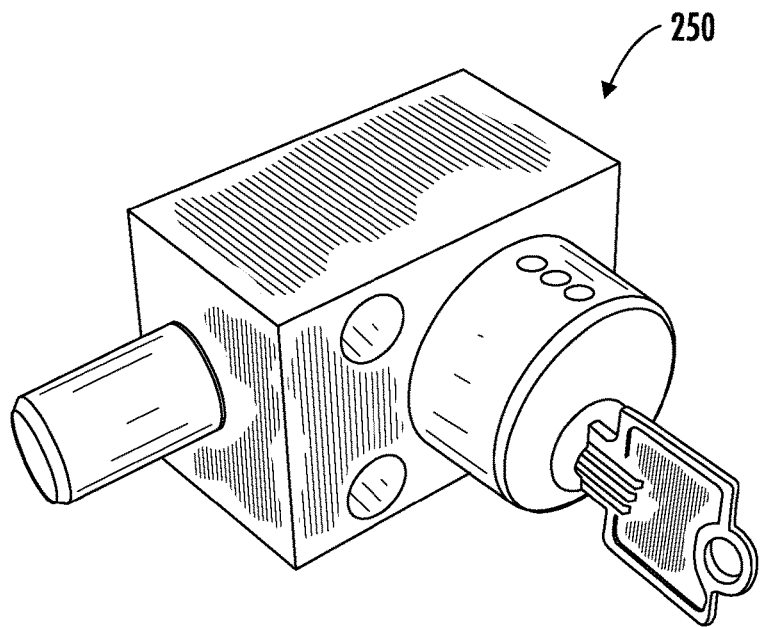
FIG. 14A is an enlarged view of the keyed interlock shown in FIG. 13A.
Figure 14B:
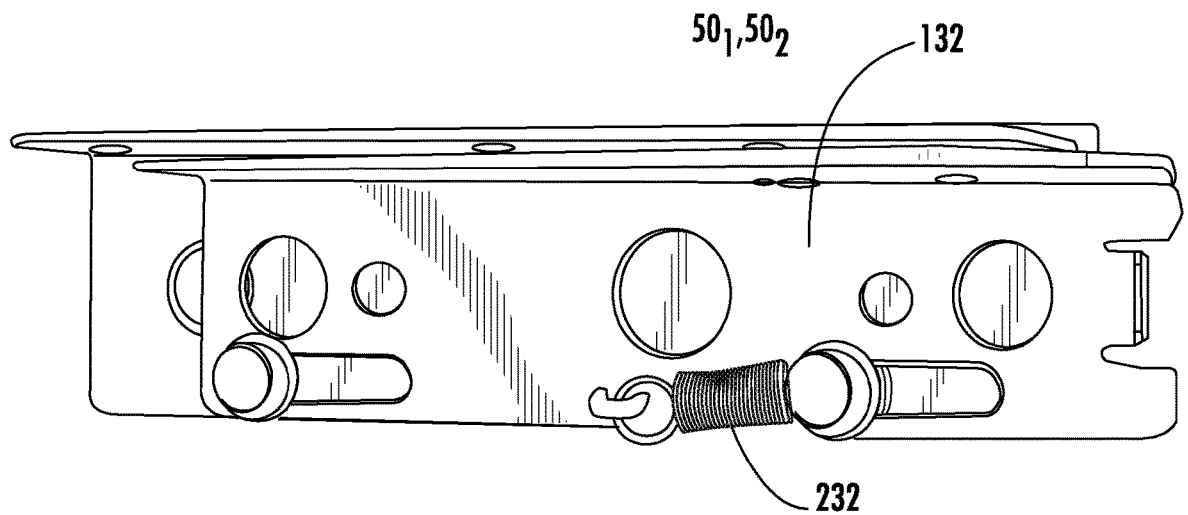
FIG. 14B is an enlarged view of a mechanically locked slide of a unit of the MCC shown in FIG. 8.

A third interlock may be used where a trapped-key interlock device 250 of a unit $50_k$, $50_2$ that allows a disconnect switch 51 (e.g., breaker) to be operated only when the key is turned to allow the handle 51 to be turned to the ON position (FIGS. 13A, 13B, 14A). As is known to those of skill in the art, a trapped-key interlock typically has a lock cylinder which operates a sliding bolt through a cam. The sliding bolt, when extended, mechanically prevents operation of a switch, valve, gate, or other device. Many variations exist, with different shapes of interlock bolt and multiple lock cylinders on an interlock. The key is held or trapped in one position of the lock; releasing the key indicates that the interlocked device has been made safe; the interlocked device cannot be re-energized until the key has been returned and operated to retract the bolt. An example of a trapped-key interlock device 250 is a Kirk® key safety interlock from Kirk Key Interlock Company, North Canton, Ohio.

A first standard unit $50_1$ with a first motor starter (e.g., a VFD, Soft starter, NEMA starter, IEC starter or the like) can be referred to as unit "A" and a second standard unit $50_2$ as a redundant unit with a motor starter of the same or different type (e.g., a VFD, Soft starter, NEMA starter or IEC starter of the like) can be referred to as unit "B" and can be placed in an adjacent location next to unit A. A third (compact) unit "C" provided as the bypass unit 10 comprises the power transfer circuit 20 with a transfer switch 25 which controls the connection to the load 80, and which switches motor control from the unit "A" to unit "B". Both unit A and unit B can comprise power disconnect assemblies 500 allowing for (FlashGard™ isolator features providing arc flash safety, e.g., a stab racking mechanism with bus isolation and stab position indicators) power bus isolated unit configurations. The disconnect switches 60 in the two units can be configured as main circuit breakers that can be mechanically interlocked with a mechanical lock such as a Kirk® Key interlock and can also be electrically interlocked with shunts trip accessories controlled by position sensors such as microswitches and auxiliary switches in those units $50_k$, $50_2$ associated with, for example, FlashGard™ isolators and interlocks. As each unit $50_k$, $50_2$ has a separate unit door 50f, each of these units can be electrically isolated and completely disconnected from the power bus 200, i.e., a 480V/600V system, providing a safe working environment.

The unit 10, $50_k$, $50_2$ can be configured for DC (direct current) and/or AC (alternating current) operation.

In some embodiments, the disconnect switch 60 of the unit 50 can comprise a molded case circuit breaker. Molded case circuit breakers are well known to those of skill in the art, as exemplified by U.S. Pat. Nos. 4,503,408 and 5,910,760, the contents of which are incorporated herein by reference as if recited in full herein. In other embodiments, the disconnect switch 60 can comprise a fused disconnect switch to turn power on and off. Either rotary or up/down operator mechanism switch handles can be used.

Exemplary fuses are FUSETRON™ 600V Class RK5 fuses (BU-SB13729) available from Cooper Bussmann Company, St. Louis, Mo. However, the design is flexible and can accommodate other fuses including those in different classes.

Figure 15A:
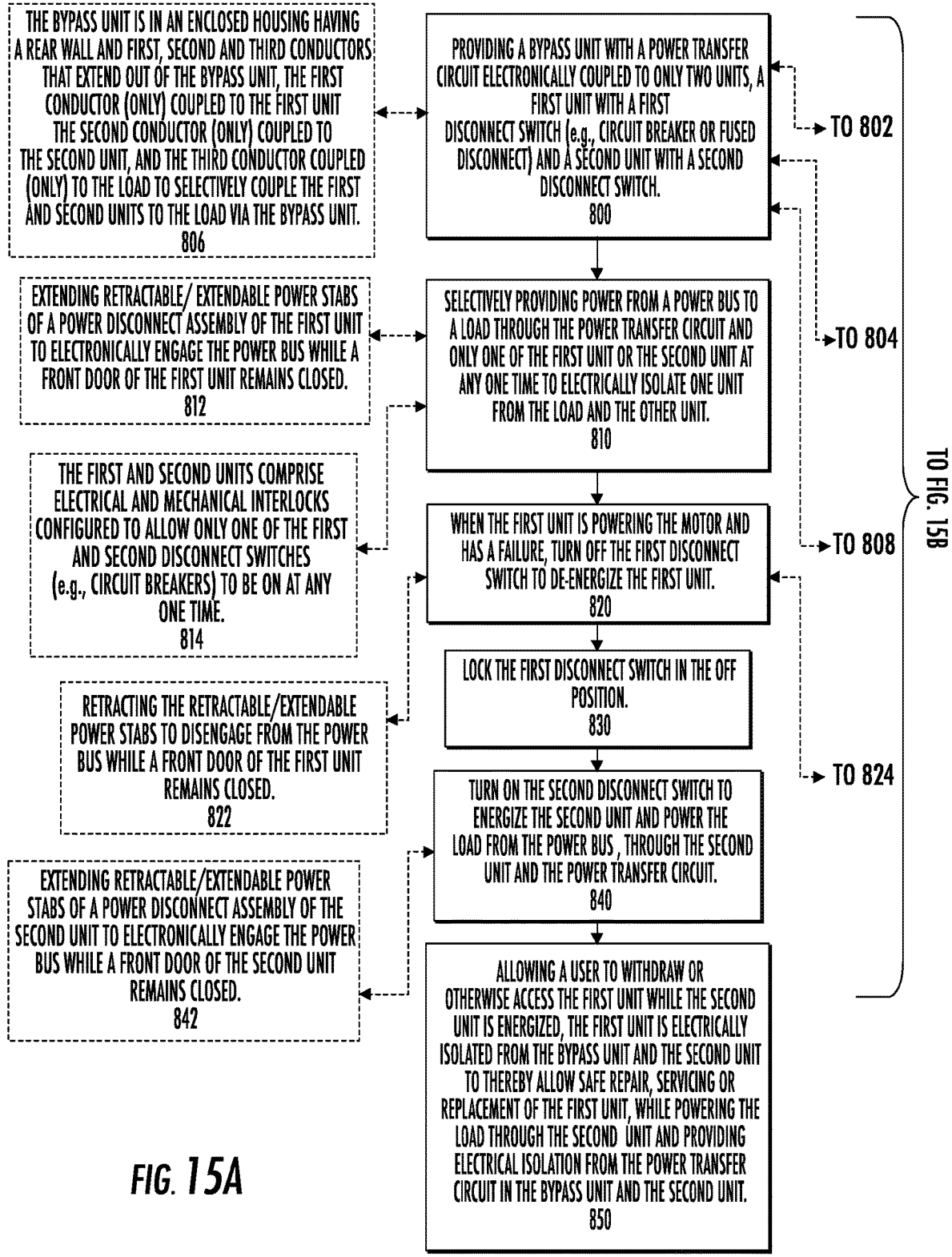
FIGS. 15A and 15B is a flow chart of actions that can be carried out to power a load according to embodiments of the present invention.
Figure 15B:
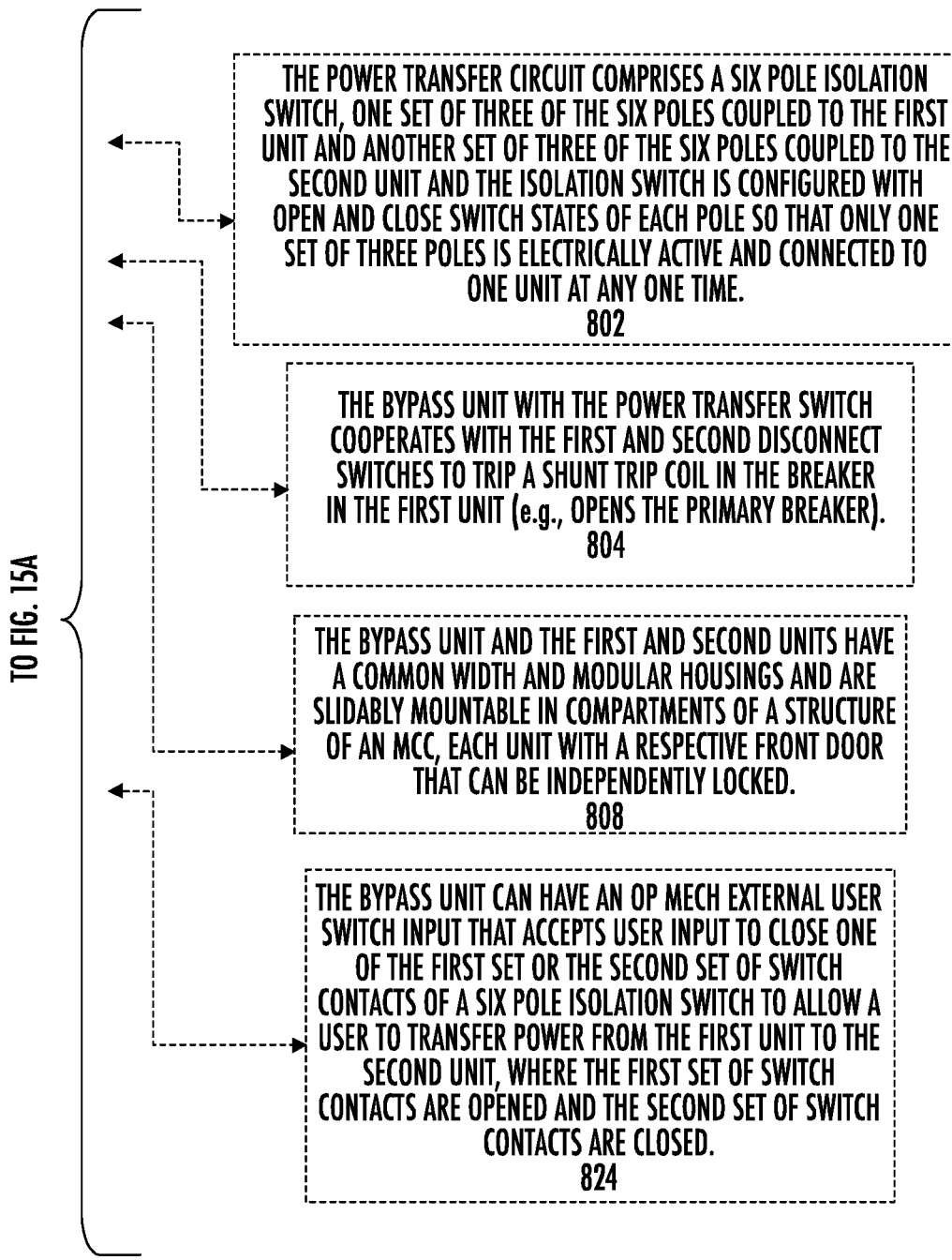

FIGS. 15A and 15B illustrate example actions that can be carried out according to embodiments of the present invention.

A bypass unit with a power transfer circuit is the power transfer circuit is provided. The power transfer circuit is electrically coupled to only two units and is configured to serially electrically couple one of the two units to a load, each of the two units having a motor starter and respective disconnect switch (block 800).

Power from a power bus is selectively provided to a load through the power transfer circuit and only one of the first unit or the second unit at any one time to thereby allow power transfer from a first unit to a second while electrically isolating the first unit from the load and the second unit (block 810).

When the first unit is powering the motor and has a failure, the first disconnect switch is turned off to prevent electrical conduction in the first unit (block 820).

The first disconnect switch is locked in the off position (block 830).

The second disconnect switch is turned on to allow electrical conduction in the second unit. Power from the power bus, through the second unit and the power transfer circuit is provided to the load (block 840).

A user is allowed to slidably withdraw or otherwise access the first unit while the second unit is operative (electrically active), with the first unit electrically isolated from the bypass unit and the second unit to thereby allow safe repair, servicing or replacement of the first unit while powering the load through the second unit and providing electrical isolation from the power transfer circuit in the bypass unit and the second unit (block 850).

The power transfer circuit can include a six pole isolation switch, with one set of three of the six poles (switch contacts) coupled to the first unit and another set of three of the six poles (switch contacts) coupled to the second unit. The isolation switch is configured with open and close switch states of each pole (switch contact) so that only one set of three poles is electrically active and connected to one unit at any one time to serially provide a first electrical path between the power bus, the bypass unit, and the load and a second electrical path between the power bus, the bypass unit, and the load (block 802)

The bypass unit with the power transfer switch cooperates with the first and second disconnect switches to force a shunt trip coil to trip the first disconnect switch (primary breaker) in the first unit to off (e.g., opens the primary breaker) (block 804).

The bypass unit and the first and second units have a common width and modular housings and are slidably mountable in compartments of a structure of an MCC, each unit with respective front doors that can be independently locked (block 808).

The bypass unit is in an enclosed housing having a rear wall and first, second and third conductors that extend out of the bypass unit, the first conductor (only) coupled to the first unit and the second conductor (only) coupled to the second unit to electrically couple the first and second units to the load via the bypass unit (block 806).

Extending retractable/extendable power stabs of a power disconnect assembly of the first unit to electrically engage the power bus while a front door of the first unit remains closed (block 812).

The first and second units comprise electrical and mechanical interlocks configured to allow only one of the first and second disconnect switches (e.g., circuit breakers) to be ON at any one time (block 814).

Retracting the retractable/extendable power stabs to disengage from the power bus while a front door of the first unit remains closed (block 822).

The bypass unit can have an external user switch input that accepts user input to close one of the first set or the second set of switch contacts of a six pole isolation switch. When transferring power from the first unit to the second unit, the first set of switch contacts are opened and the second set of switch contacts are closed (block 824).

The method can include extending retractable/extendable power stabs of a power disconnect assembly of the second unit to electrically engage the power bus while a front door of the second unit remains closed (block 842).

Figure 16:
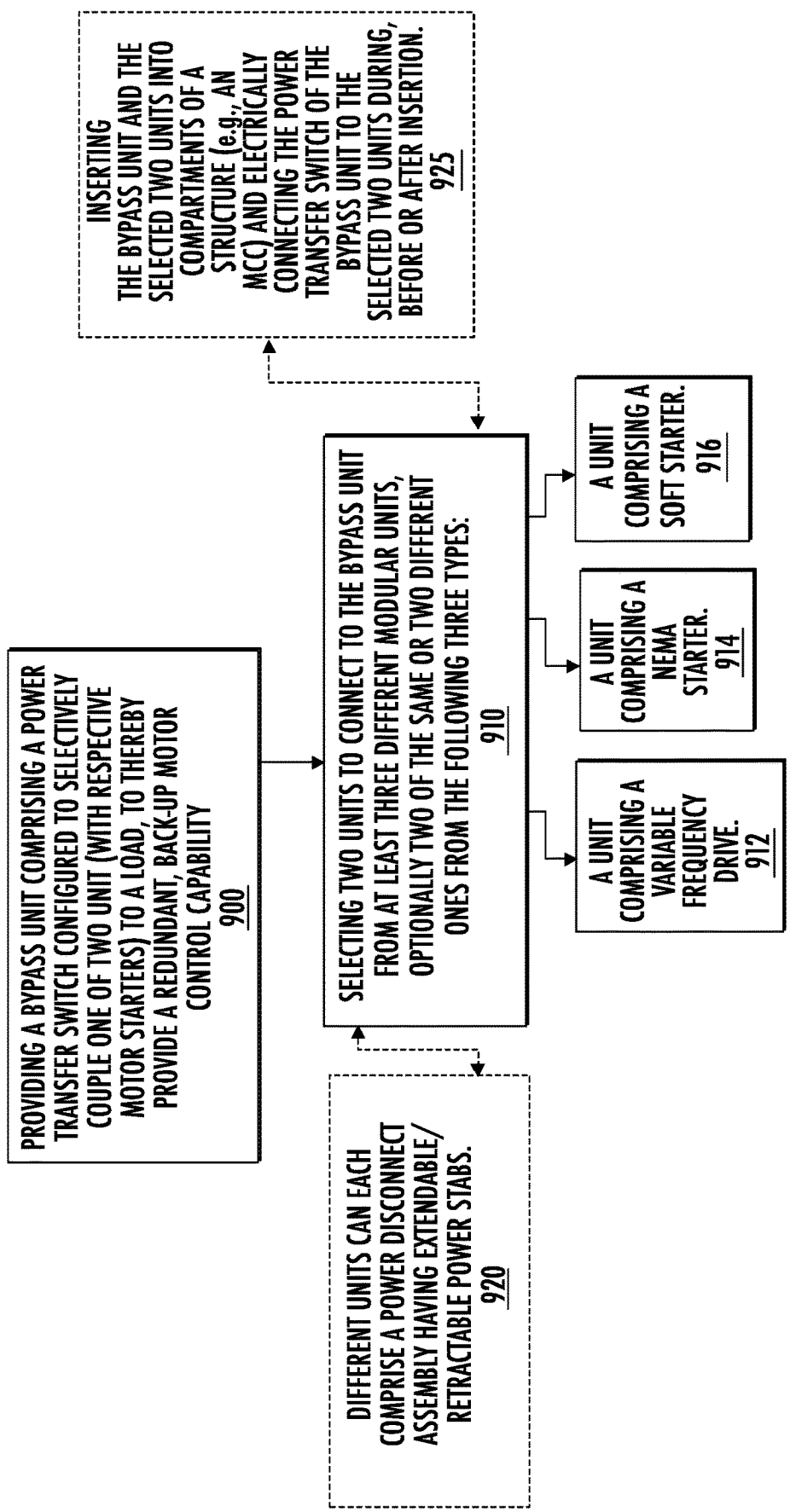
FIG. 16 is a flow chart of an example build process allowing for end user builds from a defined set of modular unit options according to embodiments of the present invention.

FIG. 16 is a flow chart of an example modular assembly method, allowing for standardized builds from defined sets of different units avoiding unique single build customization according to embodiments of the present invention.

A bypass unit is provided. The bypass unit comprising a power transfer switch configured to electrically couple to two units with respective motor starters to serially power a load and thereby provide a redundant, back-up drive capacity (block 900). Two units are selected to connect to the bypass unit from at least three different modular units, optionally two of the same or two different ones from the following at least three types (block 910).

A first unit can comprise a variable frequency drive (block 912). A second unit can comprise a NEMA starter (block 914), and a third unit can comprise a soft starter (block 916).

The first, second and third units can each comprise a power disconnect assembly having extendable/retractable power stabs (block 920).

The bypass unit and the selected two units can be slidably inserted into compartments of a structure, such as a structure of an MCC and the power transfer switch of the bypass unit is electrically coupled to the selected two units during, before or after the inserting (block 925).

It is contemplated that both "new" builds and field-retrofit structures of electrical power distribution systems 100, such as MCCs 100M, can benefit from the new bypass unit 10 and primary and secondary units 50₁, 50₂ discussed above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An electrical power distribution system comprising:
a power bus;
a bypass unit comprising a power transfer switch coupled to a load;
a first unit comprising a first disconnect switch configured to couple the power bus to the power transfer switch; and
a second unit comprising a second disconnect switch configured to couple the power bus to the power transfer switch,
wherein the power transfer switch of the bypass unit is configured to selectively couple the first unit to the load or the second unit to the load,
wherein, when the first disconnect switch is closed and the power transfer switch couples the first unit to the load, the second disconnect switch is open to electrically isolate the second unit from the load and the first unit, and
wherein, when the second disconnect switch is closed and the power transfer switch couples the second unit to the load, the first disconnect switch is open to electrically isolate the first unit from the load and the second unit,
wherein the first and second units each further comprise a respective housing and a respective power disconnect assembly with extendable/retractable power stabs that independently move relative to the respective housing to connect to and disconnect from the power bus, and wherein the extendable/retractable power stabs of only one of the first unit or the second unit is permitted to be connected to the power bus at any one time.

2. An electrical power distribution system comprising:
a power bus;
a bypass unit comprising a power transfer switch coupled to a load;
a first unit comprising a first disconnect switch configured to couple the power bus to the power transfer switch; and
a second unit comprising a second disconnect switch configured to couple the power bus to the power transfer switch,
wherein the power transfer switch of the bypass unit is configured to selectively couple the first unit to the load or the second unit to the load,
wherein, when the first disconnect switch is closed and the power transfer switch couples the first unit to the load, the second disconnect switch is open to electrically isolate the second unit from the load and the first unit, and wherein, when the second disconnect switch is closed and the power transfer switch couples the second unit to the load, the first disconnect switch is open to electrically isolate the first unit from the load and the second unit, wherein the bypass unit comprises a housing with a front wall, side walls and a closed rear wall and is devoid of power stabs, wherein the bypass unit connects to the power bus only through the first unit or the second unit whereby the bypass unit does not directly connect to the power bus, and wherein the first unit and the second unit electrically connect to the load only through the power transfer switch of the bypass unit.

3. An electrical power distribution system comprising:
a power bus;
a bypass unit comprising a power transfer switch coupled to a load;
a first unit comprising a first disconnect switch configured to couple the power bus to the power transfer switch; and
a second unit comprising a second disconnect switch configured to couple the power bus to the power transfer switch,
wherein the power transfer switch of the bypass unit is configured to selectively couple the first unit to the load or the second unit to the load,
wherein, when the first disconnect switch is closed and the power transfer switch couples the first unit to the load, the second disconnect switch is open to electrically isolate the second unit from the load and the first unit, and
wherein, when the second disconnect switch is closed and the power transfer switch couples the second unit to the load, the first disconnect switch is open to electrically isolate the first unit from the load and the second unit,
wherein each of the bypass unit, the first unit and the second unit include a separate housing that is independently insertable and removable from a respective compartment in at least one structure of the electrical power distribution system, and wherein adjacent compartments are separated from each other by at least one wall to physically isolate respective adjacent units from each other.

4. The electrical power distribution system of claim 1, further comprising at least one structure with defined spaced-apart internal compartments that hold the bypass unit, the first unit and the second unit in different ones of the defined spaced-apart internal compartments, wherein the first unit and the second unit are separately and slidably removable from the internal compartments, wherein the first unit comprises a first front door with a first disconnect operator handle operably coupled to the first disconnect switch, wherein the second unit comprises a second front door with a second disconnect operator handle operably coupled to the second disconnect switch, and wherein the electrical power distribution system comprises interlocks that (a) prevent the first front door from opening when either the first disconnect switch is closed or the first unit is coupled to the load and (b) prevent the second front door from opening when either the second disconnect switch is closed or the second unit is coupled to the load.

5. The electrical power distribution system of claim 1, wherein the bypass unit and the first and second units are each configured to be insertable into and removable from spaced-apart compartments of a structure, and wherein the bypass unit and the first and second units each include an operator mechanism coupled to a respective user-accessible operator handle that is configured to be padlocked in an ON and OFF position.

6. The electrical power distribution system of claim 1, wherein the first disconnect switch includes a first circuit breaker and the second disconnect switch includes a second circuit breaker, and wherein the first and second circuit breakers are electrically interlocked, such that only one of the first and second circuit breakers can be closed at any one time,
wherein the first and second units are operatively connected and configured to cause a first one of either the first circuit breaker or the second circuit breaker to trip to an open state when a second one of the first circuit breaker or the second circuit breaker is closed to allow only a single one of the first or second circuit breaker to be in an on state at any one time.

7. The electrical power distribution system of claim 1, wherein the electrical power distribution system is a motor control center (MCC), and wherein the first and second units comprise motor starters.

8. The electrical power distribution system of claim 1, wherein the first disconnect switch includes a first circuit breaker and the second disconnect switch includes a second circuit breaker, and wherein the first and second circuit breakers and the power transfer switch are electrically interlocked, such that, when the power transfer switch couples one of the first and second units to the load, only the associated first or second circuit breaker can be closed.

9. The electrical power distribution system of claim 8, wherein the power transfer switch further comprises at least one auxiliary switch coupled to the first and second circuit breakers that is configured to transmit a trip signal to the first circuit breaker of the first disconnect switch when the power transfer switch couples the second unit to the load.

10. An electrical power distribution system comprising:
a power bus;
a bypass unit comprising a power transfer switch coupled to a load;
a first unit comprising a first disconnect switch configured to couple the power bus to the power transfer switch; and
a second unit comprising a second disconnect switch configured to couple the power bus to the power transfer switch,
wherein the power transfer switch of the bypass unit is configured to selectively couple the first unit to the load or the second unit to the load,
wherein, when the first disconnect switch is closed and the power transfer switch couples the first unit to the load, the second disconnect switch is open to electrically isolate the second unit from the load and the first unit, and
wherein, when the second disconnect switch is closed and the power transfer switch couples the second unit to the load, the first disconnect switch is open to electrically isolate the first unit from the load and the second unit,
wherein the first unit comprises a first motor starter and the second unit comprises a second motor starter, wherein the first unit is provided in a first housing enclosing the first disconnect switch and comprising a first power stab assembly with power stabs that are retractable and extendable relative to the first housing and the second unit is provided in a second housing enclosing the second disconnect switch and comprising a second power stab assembly with power stabs that are retractable and extendable relative to the second housing.

11. The electrical power distribution system of claim 1, wherein the first unit and the second unit comprise motor starters configured as one of options A-L:

| Option | first unit | second unit |
|---|---|---|
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder with Fused Disconnect Switch | Feeder with Fused Disconnect Switch. |

12. An electrical power distribution system comprising:
a power bus;
a bypass unit comprising a power transfer switch coupled to a load;
a first unit comprising a first disconnect switch configured to couple the power bus to the power transfer switch; and
a second unit comprising a second disconnect switch configured to couple the power bus to the power transfer switch,
wherein the power transfer switch of the bypass unit is configured to selectively couple the first unit to the load or the second unit to the load,
wherein, when the first disconnect switch is closed and the power transfer switch couples the first unit to the load, the second disconnect switch is open to electrically isolate the second unit from the load and the first unit, and
wherein, when the second disconnect switch is closed and the power transfer switch couples the second unit to the load, the first disconnect switch is open to electrically isolate the first unit from the load and the second unit,
wherein the power transfer switch comprises a six-pole isolating switch, wherein the six-pole isolating switch comprises a first set of three switch contacts coupled to the first unit and a second set of three switch contacts coupled to the second unit to thereby allow the six-pole isolating switch to selectively couple the first unit or the second unit to the load.

13. The electrical power distribution system of claim 12, wherein the bypass unit further comprises a first conductor coupled to the first set of switch contacts, a second conductor coupled to the second set of switch contacts, and a third conductor configured to couple to the load, the first conductor extending from the bypass unit a distance sufficient to couple to the first unit, the second conductor extending from the bypass unit a distance sufficient to couple to the second unit, and the third conductor having a length sufficient to couple to the load.

14. The electrical power distribution system of claim 13, wherein the first and second conductors extend from the bypass unit through a wire way to connect to the respective first and second units.

15. The electrical power distribution system of claim 1, wherein the electrical power distribution system is a motor control center (MCC), wherein the first unit and the second unit each comprise a lock that, when deployed, physically (a) locks the power disconnect assembly in at least one defined position associated with one or both (i) a retracted position associated with an electrically isolated state of the respective unit or (ii) an extended position associated with engagement with the power bus and an electrically active state, and/or (b) locks a laterally movable slide from allowing access to an aperture that allows a crank to change a position of the power stabs.

16. The electrical power distribution system of claim 15, further comprising at least one interlock that is configured to allow a user to open or slidably remove one of the first unit or the second unit from the MCC only when a respective unit is in the electrically isolated state while allowing another one of the first unit or the second unit to be energized and power the load through the bypass unit.

17. The electrical power distribution system of claim 1, wherein each of the first and second units is devoid of wheels and is slidably and releasably held in defined separate compartments of a structure of the electrical power distribution system and each is serially interchangeable with a different corresponding unit having a common size and shape housing thereby allowing modular repair and replacement, and wherein the bypass unit is held in a housing with a closed front door and has a height that is in a range of about 6-12 inches.

18. An electrical power distribution system comprising:
a power bus;
a bypass unit comprising a power transfer switch coupled to a load;
a first unit comprising a first disconnect switch configured to couple the power bus to the power transfer switch; and
a second unit comprising a second disconnect switch configured to couple the power bus to the power transfer switch,
wherein the power transfer switch of the bypass unit is configured to selectively couple the first unit to the load or the second unit to the load,
wherein, when the first disconnect switch is closed and the power transfer switch couples the first unit to the load, the second disconnect switch is open to electrically isolate the second unit from the load and the first unit, and
wherein, when the second disconnect switch is closed and the power transfer switch couples the second unit to the load, the first disconnect switch is open to electrically isolate the first unit from the load and the second unit,
wherein the bypass unit, the first unit and the second unit are held in separate housings, wherein the bypass unit, the first unit and the second unit are configured to power a load with horsepower in a range of about ¼ horsepower to 200 horsepower, and wherein the bypass unit has a closed front door with a front operating switch handle coupled to an isolation switch of the power transfer switch.

19. An electrical power distribution system comprising:
a power bus;
a bypass unit comprising a power transfer switch coupled to a load;
a first unit comprising a first disconnect switch configured to couple the power bus to the power transfer switch; and a second unit comprising a second disconnect switch configured to couple the power bus to the power transfer switch, wherein the power transfer switch of the bypass unit is configured to selectively couple the first unit to the load or the second unit to the load, wherein, when the first disconnect switch is closed and the power transfer switch couples the first unit to the load, the second disconnect switch is open to electrically isolate the second unit from the load and the first unit, and wherein, when the second disconnect switch is closed and the power transfer switch couples the second unit to the load, the first disconnect switch is open to electrically isolate the first unit from the load and the second unit, wherein the power transfer switch of the bypass unit comprises a six-pole isolation switch defining a main switch body and at least one auxiliary switch attached thereto, and wherein the at least one auxiliary switch is configured to transmit and/or receive control signals to/from at least one of the first or second units.

20. The electrical power distribution system of claim 14, wherein the first and second conductors extend out from a right side of the bypass unit.

\* \* \* \* \*

UNITED STATES PATENT AND TRADEMARK OFFICE
CERTIFICATE OF CORRECTION

PATENT NO. : 11,482,911 B2
APPLICATION NO. : 16/911557
DATED : October 25, 2022
INVENTOR(S) : Robert A. Morris It is certified that error appears in the above-identified patent and that said Letters Patent is hereby corrected as shown below:

In the Specification

Column 10, Line 20: "units $50_k$, $50_2$," should read -- units $50_1$, $50_2$, --

Column 11, Line 11: "unit $50_k$," should read -- unit $50_1$, --
    Line 25: "units $50_k$, $50_2$, The ON" should read -- units $50_1$, $50_2$. The ON --
    Line 37: "10, $50_k$, $50_2$" should read -- 10, $50_1$, $50_2$ --
    Line 39: "10, $50_k$, $50_2$" should read -- 10, $50_1$, $50_2$ --

Column 12, Line 2: "units $50_k$, $50_2$" should read -- units $50_1$, $50_2$ --
    Lines 6 and 7: "unit $50_k$, 50," should read -- unit $50_1$, $50_2$ --
    Line 19: "set $26_k$, $26_2$" should read -- set $26_1$, $26_2$ --
    Line 23: "unit $50_k$," should read -- unit $50_1$, --
    Line 27: "units $50_k$, $50_2$" should read -- units $50_1$, $50_2$ --
    Line 48: "units $50_k$, $50_2$" should read -- units $50_1$, $50_2$ --
    Line 56: "unit $50_k$." should read -- unit $50_1$. --
    Line 57: "unit $50_k$," should read -- unit $50_1$, --

Column 14, Line 2: "units $50_k$, $50_2$" should read -- units $50_1$, $50_2$ --
    Line 6: "units $50_k$, $50_2$" should read -- units $50_1$, $50_2$ --
    Line 11: "$50_k$, $50_2$ when" should read -- $50_1$, $50_2$ when --
    and "units $50_k$," should read -- units $50_1$, --
    Line 62: "units $50_k$," should read -- units $50_1$, --

Column 15, Line 2: "$50_k$, $50_2$ can" should read -- $50_1$, $50_2$ can --
    Line 7: "10, $50_k$, $50_2$." should read -- 10, $50_1$, $50_2$. --
    Line 8: "units $50_k$, $50_2$" should read -- units $50_1$, $50_2$ --
    Line 60: "units $50_k$, $50_2$ of" should read -- units $50_1$, $50_2$ of --

Signed and Sealed this
Sixth Day of December, 2022

Katherine Kelly Vidal
*Director of the United States Patent and Trademark Office*

CERTIFICATE OF CORRECTION (continued)
U.S. Pat. No. 11,482,911 B2

Column 16, Line 18: "units $50_k$, $50_2$ via" should read -- units $50_1$, $50_2$ via --
    Line 28: "unit $50_k$, $50_2$" should read -- unit $50_1$, $50_2$ --
    Line 32: "$50_k$, $50_2$ are" should read -- $50_1$, $50_2$ are --
    Line 41: "unit 10, $50_k$, $50_2$," should read -- unit 10, $50_1$, $50_2$, --
    Lines 46 and 47: "second units $50_k$, $50_2$" should read -- second units $50_1$, $50_2$ --

Column 17, Line 23: "10, 54, $50_k$," should read -- 10, 54, $50_1$, --
    Line 28: "units $50_k$, $50_2$." should read -- units $50_1$, $50_2$. --
    Line 30: "$50_k$, $50_2$ can" should read -- $50_1$, $50_2$ can --
    Line 58: "unit $50_k$, $50_2$." should read -- unit $50_1$, $50_2$. --

Column 18, Line 4: "unit $50_k$, $50_2$." should read -- unit $50_1$, $50_2$. --
    Line 5: "unit $50_k$, $50_2$" should read -- unit $50_1$, $50_2$ --
    Line 11: "unit $50_k$, $50_2$" should read -- unit $50_1$, $50_2$ --
    Line 27: "unit $50_k$, $50_2$." should read -- unit $50_1$, $50_2$. --
    Line 67: "units $50_k$, $50_2$." should read -- units $50_1$, $50_2$. --

Column 19, Lines 1 and 2: "units $50_k$, $50_2$" should read -- units $50_1$, $50_2$ --
    Line 14: "unit $50_k$, $50_2$." should read -- unit $50_1$, $50_2$. --
    Line 20: "units $50_k$, $50_2$," should read -- units $50_1$, $50_2$, --
    Line 28: "units $50_k$, $50_2$" should read -- units $50_1$, $50_2$ --
    Line 39: "unit $50_k$, $50_2$" should read -- unit $50_1$, $50_2$ --

Column 20, Line 9: "units $50_k$, $50_2$" should read -- units $50_1$, $50_2$ --
    Line 11: "unit $50_k$, $50_2$" should read -- unit $50_1$, $50_2$ --
    Line 15: "10, $50_k$, $50_2$" should read -- 10, $50_1$, $50_2$ --